US012634055B2

(12) United States Patent
Sun et al.

(10) Patent No.: US 12,634,055 B2
(45) Date of Patent: May 19, 2026

(54) DYNAMIC CARRIER SHARING TECHNIQUES FOR RADIO UNIT SHARING

(71) Applicant: QUALCOMM Incorporated, San Diego, CA (US)

(72) Inventors: Jing Sun, San Diego, CA (US); Aleksandar Damnjanovic, Del Mar, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 445 days.

(21) Appl. No.: 17/954,149

(22) Filed: Sep. 27, 2022

(65) Prior Publication Data

US 2024/0106582 A1 Mar. 28, 2024

(51) Int. Cl.
| | |
|---|---|
| *H04L 5/00* | (2006.01) |
| *H04L 5/14* | (2006.01) |
| *H04W 16/14* | (2009.01) |
| *H04W 56/00* | (2009.01) |
| *H04W 74/0833* | (2024.01) |

(52) U.S. Cl.
CPC .............. *H04L 5/0005* (2013.01); *H04L 5/14* (2013.01); *H04W 16/14* (2013.01); *H04W 56/0015* (2013.01); *H04W 74/0833* (2013.01)

(58) Field of Classification Search
CPC .......... H04L 5/005; H04L 5/14; H04W 16/14; H04W 56/0015; H04W 74/0833
USPC ....................................................... 370/411
See application file for complete search history.

(56) References Cited

U.S. PATENT DOCUMENTS

| | | | |
|---|---|---|---|
| 2015/0109987 A1* | 4/2015 | Wang ..................... | H04W 12/08 |
| | | | 370/312 |
| 2016/0073406 A1* | 3/2016 | Aydin ................. | H04W 36/304 |
| | | | 370/329 |
| 2016/0337817 A1* | 11/2016 | Malladi ................. | H04W 72/30 |

OTHER PUBLICATIONS

International Search Report and Written Opinion—PCT/US2023/073363—ISA/EPO—Feb. 2, 2024.
Ericsson: "Cross Carrier and Multi-operator Scheduling for V2V over PC5", 3GPP TSG RAN WG1 Meeting #86, R1-166956, vol. RAN WG1, No. Gothenburg, Sweden, Aug. 22, 2016-Aug. 26, 2016, Aug. 21, 2016, 3 Pages, XP051140459, Sections 1-4.
Partial International Search Report—PCT/US2023/073363—ISA/EPO—Dec. 11, 2023.

* cited by examiner

*Primary Examiner* — Chi Tang P Cheng
(74) *Attorney, Agent, or Firm* — Holland & Hart LLP

(57) ABSTRACT

Methods, systems, and devices for wireless communications are described that provide for dynamic carrier sharing at a radio unit (RU) by multiple operators. Multiple operators may coordinate regarding resource separation such that wireless resources associated with the shared carrier may be split between the operators using, for example, time-division multiplexing, frequency-division multiplexing, and/or spatial-division multiplexing. Signal transmissions to and from the RU, using a carrier that supports multiple operators, may be based on a separation between certain physical layer (PHY) transmissions, where some PHY transmissions to or from the RU may be common for the multiple operators, and other PHY transmissions may use different sets of resources that are respectively associated with the different operators.

27 Claims, 28 Drawing Sheets

115-d

UE 105-b

Network
Entity
(e.g., RU)

Determine Carrier
Sharing Resources
And Parameters

905

Signaling With Carrier &
PHY Characteristics

910

915

Determine System
Information And
RACH Parameters

RACH Access Procedure

920

Scheduling Information

925

Unicast Communications

930

900

130

105

115

Network
Entity

Transceiver

1310

Antenna

1315

Communications
Manager

1320

Memory

Code

1330

1325

1340

Processor

1335

1305

1300

Figure 18:
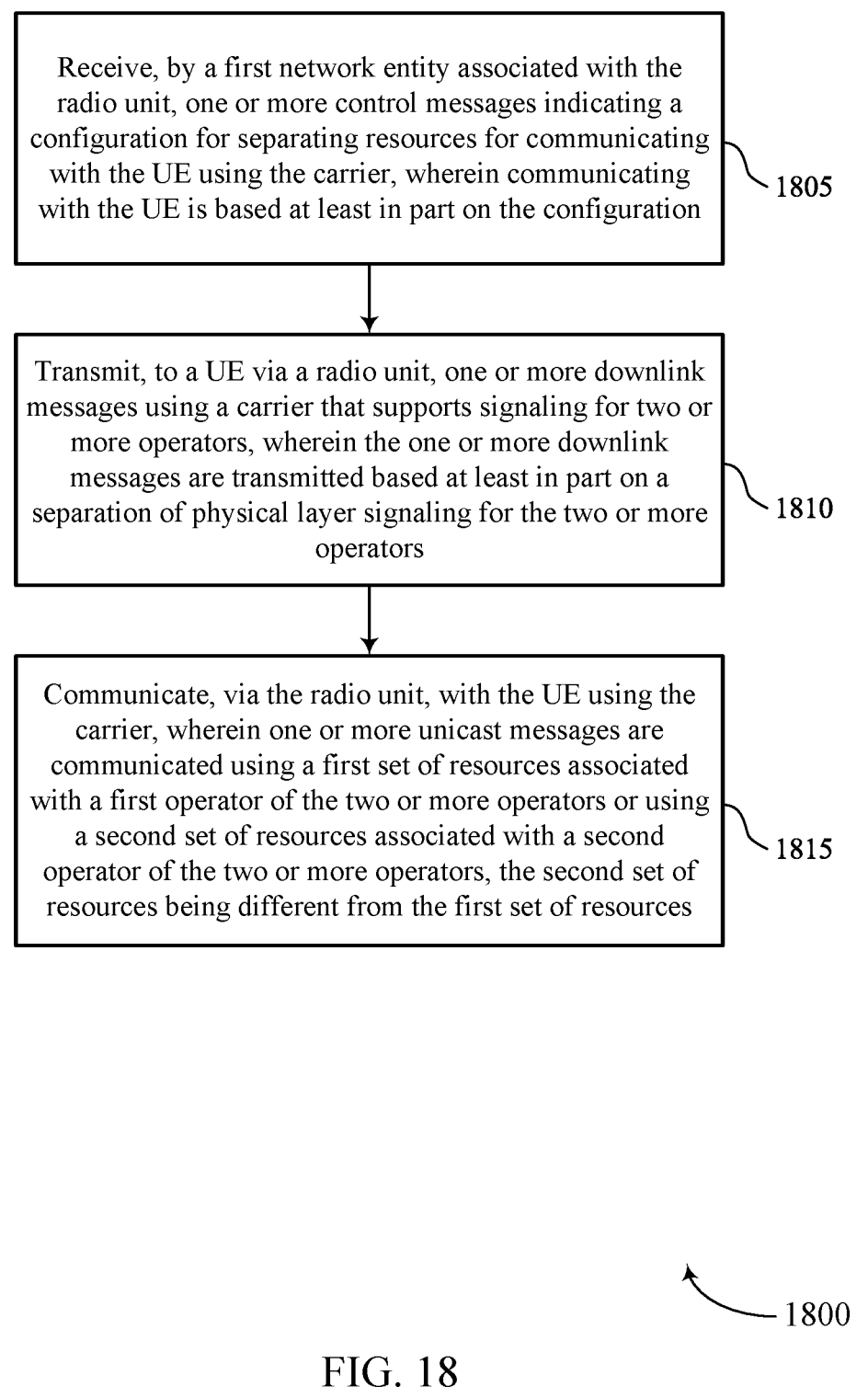

Receive, by a first network entity associated with the radio unit, one or more control messages indicating a configuration for separating resources for communicating with the UE using the carrier, wherein communicating with the UE is based at least in part on the configuration

1805

Transmit, to a UE via a radio unit, one or more downlink messages using a carrier that supports signaling for two or more operators, wherein the one or more downlink messages are transmitted based at least in part on a separation of physical layer signaling for the two or more operators

1810

Communicate, via the radio unit, with the UE using the carrier, wherein one or more unicast messages are communicated using a first set of resources associated with a first operator of the two or more operators or using a second set of resources associated with a second operator of the two or more operators, the second set of resources being different from the first set of resources

Figure 20:
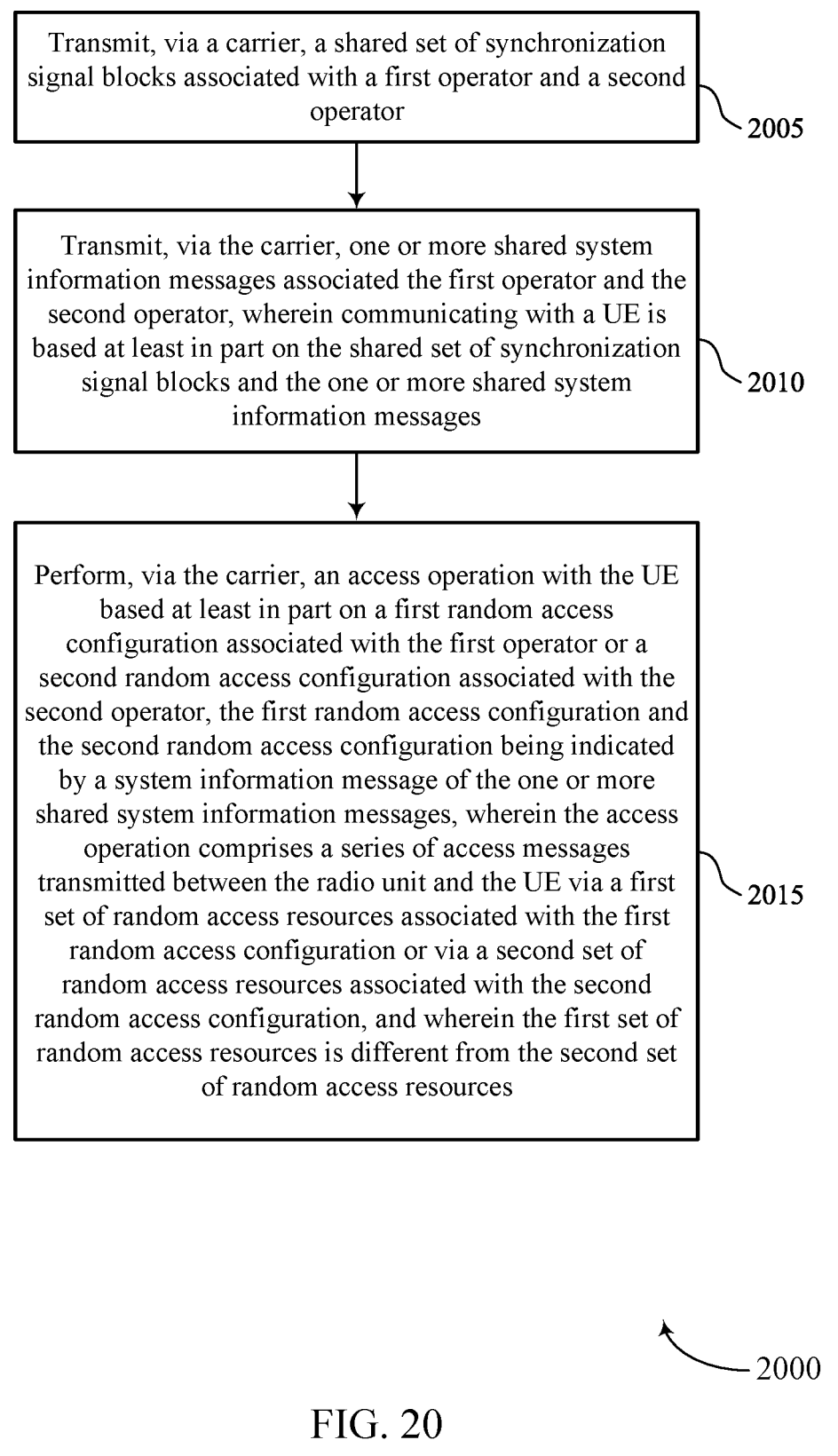

Transmit, via a carrier, a shared set of synchronization signal blocks associated with a first operator and a second operator

⟜ 2005

Transmit, via the carrier, one or more shared system information messages associated the first operator and the second operator, wherein communicating with a UE is based at least in part on the shared set of synchronization signal blocks and the one or more shared system information messages

⟜ 2010

Perform, via the carrier, an access operation with the UE based at least in part on a first random access configuration associated with the first operator or a second random access configuration associated with the second operator, the first random access configuration and the second random access configuration being indicated by a system information message of the one or more shared system information messages, wherein the access operation comprises a series of access messages transmitted between the radio unit and the UE via a first set of random access resources associated with the first random access configuration or via a second set of random access resources associated with the second random access configuration, and wherein the first set of random access resources is different from the second set of random access resources

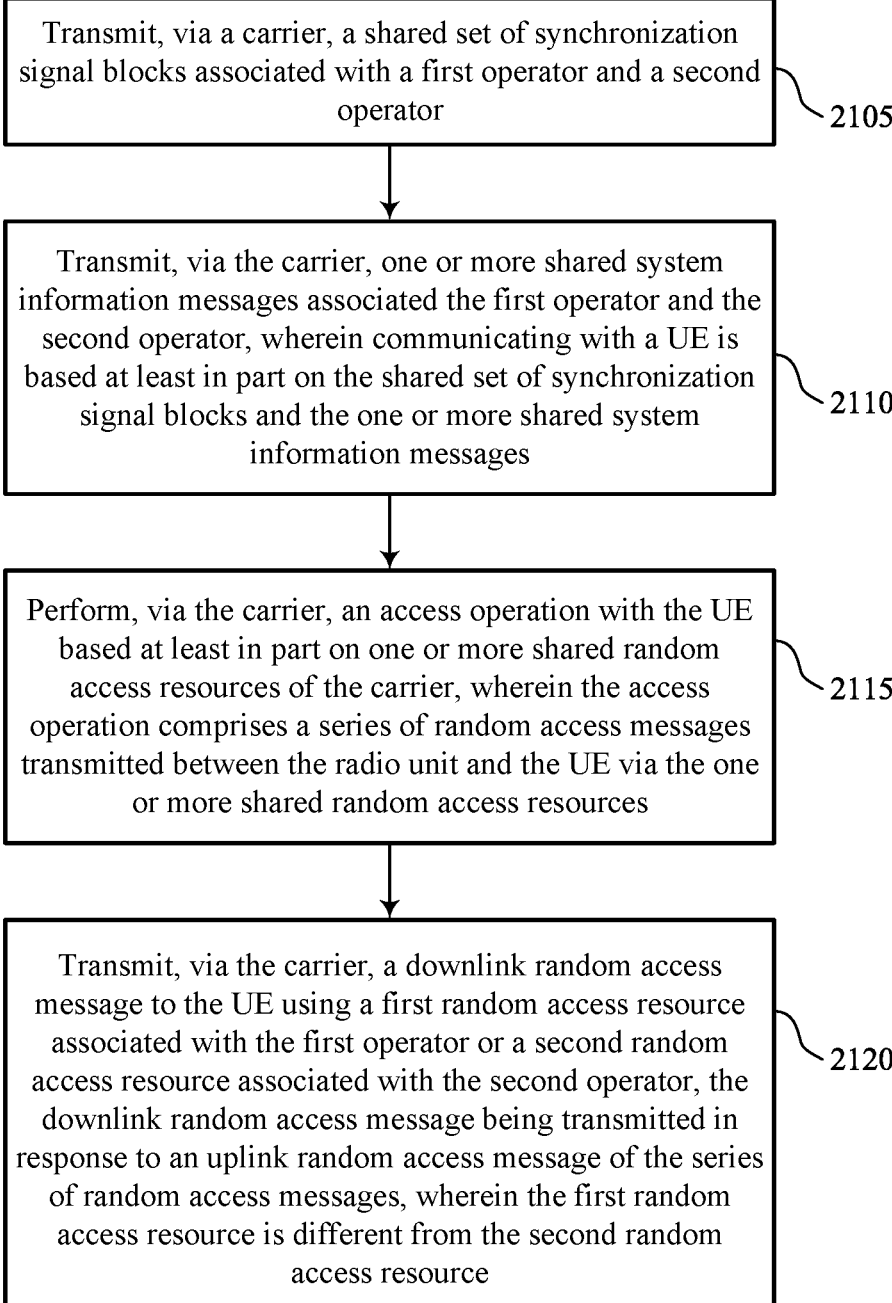

Transmit, via a carrier, a shared set of synchronization signal blocks associated with a first operator and a second operator

2105

Transmit, via the carrier, one or more shared system information messages associated the first operator and the second operator, wherein communicating with a UE is based at least in part on the shared set of synchronization signal blocks and the one or more shared system information messages

2110

Perform, via the carrier, an access operation with the UE based at least in part on one or more shared random access resources of the carrier, wherein the access operation comprises a series of random access messages transmitted between the radio unit and the UE via the one or more shared random access resources

2115

Transmit, via the carrier, a downlink random access message to the UE using a first random access resource associated with the first operator or a second random access resource associated with the second operator, the downlink random access message being transmitted in response to an uplink random access message of the series of random access messages, wherein the first random access resource is different from the second random access resource

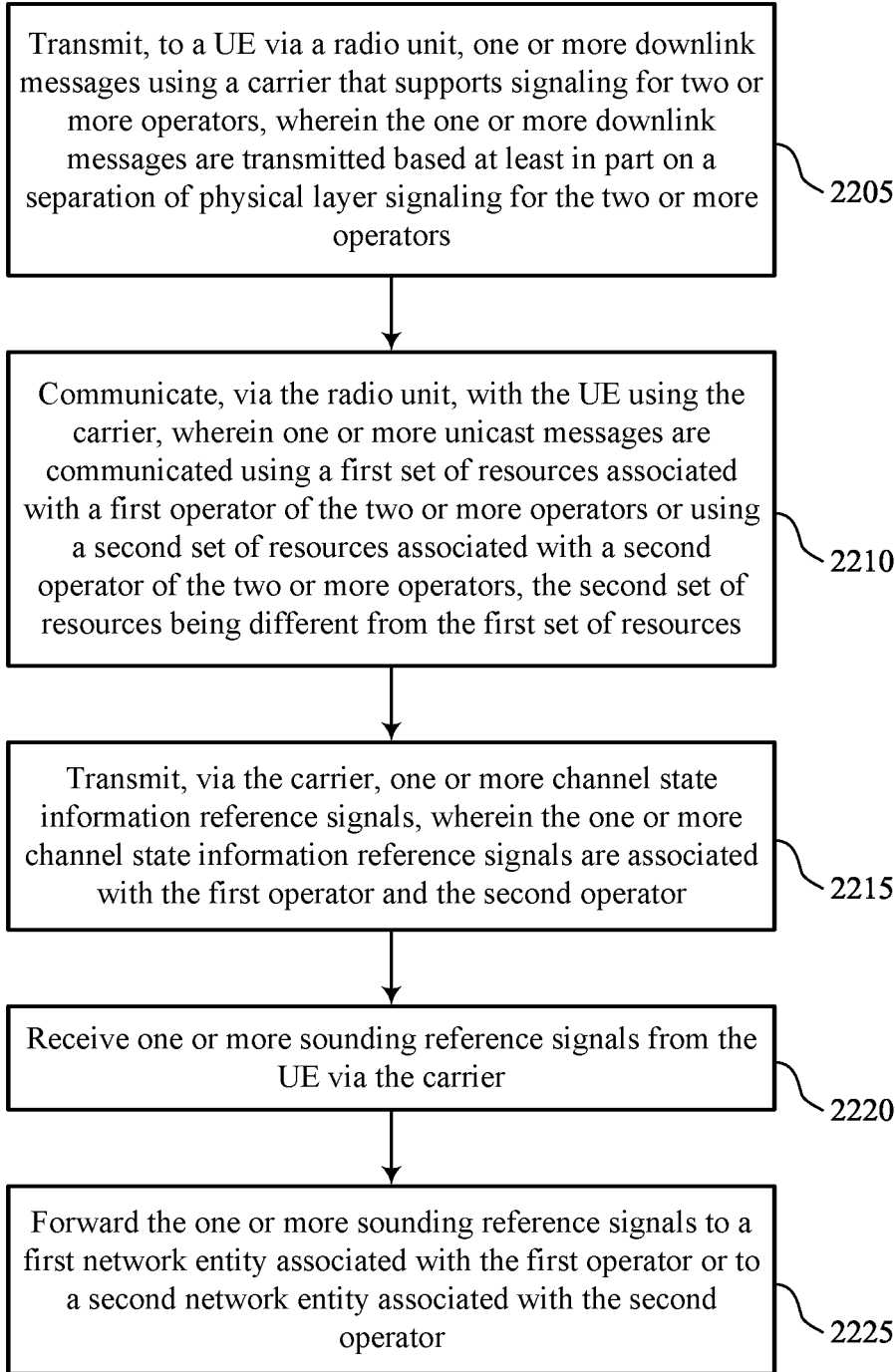

Transmit, to a UE via a radio unit, one or more downlink messages using a carrier that supports signaling for two or more operators, wherein the one or more downlink messages are transmitted based at least in part on a separation of physical layer signaling for the two or more operators

2205

Communicate, via the radio unit, with the UE using the carrier, wherein one or more unicast messages are communicated using a first set of resources associated with a first operator of the two or more operators or using a second set of resources associated with a second operator of the two or more operators, the second set of resources being different from the first set of resources

2210

Transmit, via the carrier, one or more channel state information reference signals, wherein the one or more channel state information reference signals are associated with the first operator and the second operator

2215

Receive one or more sounding reference signals from the UE via the carrier

2220

Forward the one or more sounding reference signals to a first network entity associated with the first operator or to a second network entity associated with the second operator

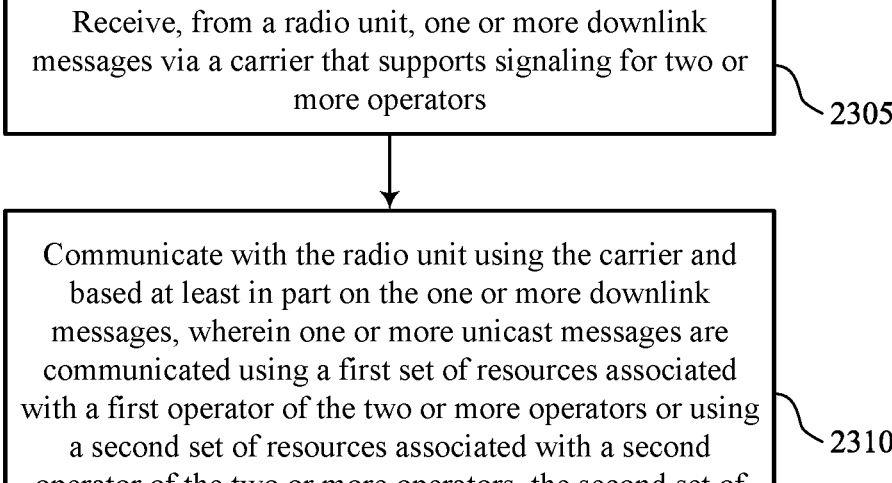

Receive, from a radio unit, one or more downlink messages via a carrier that supports signaling for two or more operators

2305

Communicate with the radio unit using the carrier and based at least in part on the one or more downlink messages, wherein one or more unicast messages are communicated using a first set of resources associated with a first operator of the two or more operators or using a second set of resources associated with a second operator of the two or more operators, the second set of resources being different from the first set of resources

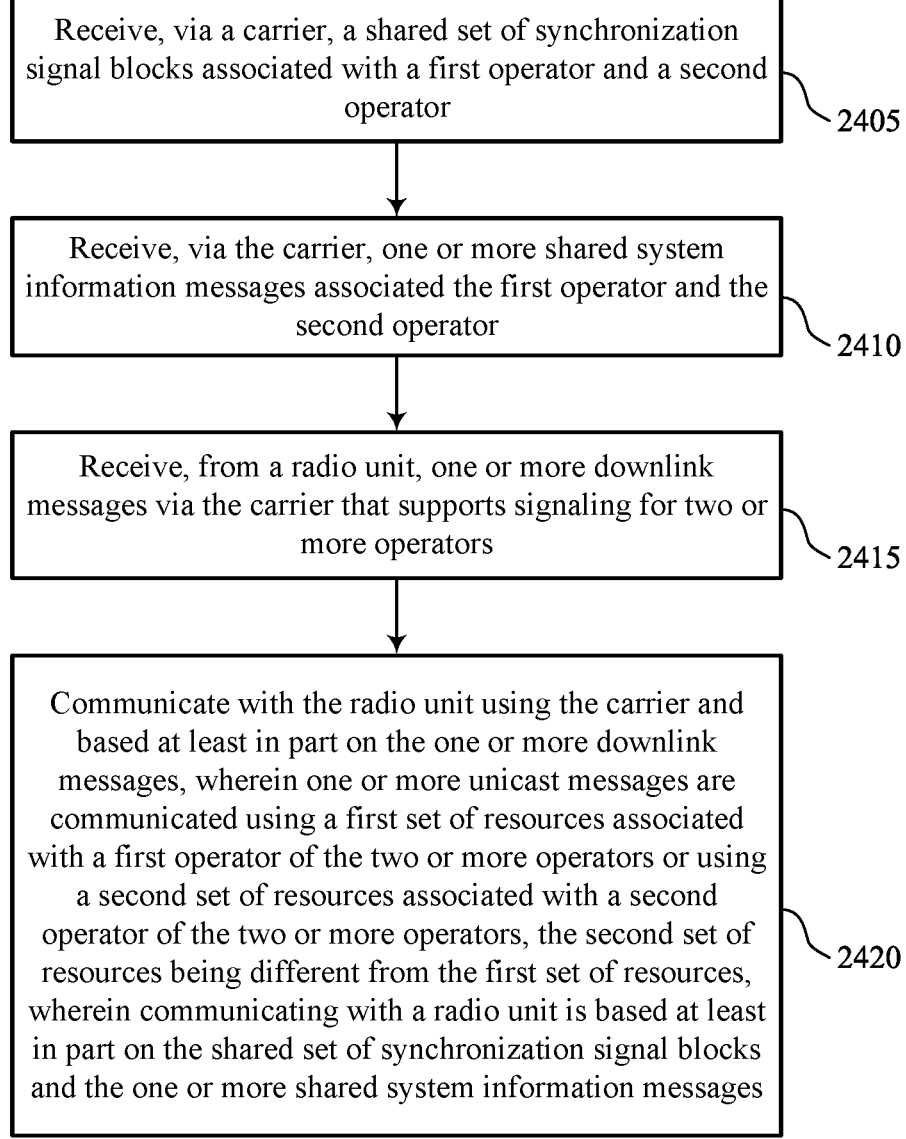

Receive, via a carrier, a shared set of synchronization signal blocks associated with a first operator and a second operator

2405

Receive, via the carrier, one or more shared system information messages associated the first operator and the second operator

2410

Receive, from a radio unit, one or more downlink messages via the carrier that supports signaling for two or more operators

2415

Communicate with the radio unit using the carrier and based at least in part on the one or more downlink messages, wherein one or more unicast messages are communicated using a first set of resources associated with a first operator of the two or more operators or using a second set of resources associated with a second operator of the two or more operators, the second set of resources being different from the first set of resources, wherein communicating with a radio unit is based at least in part on the shared set of synchronization signal blocks and the one or more shared system information messages

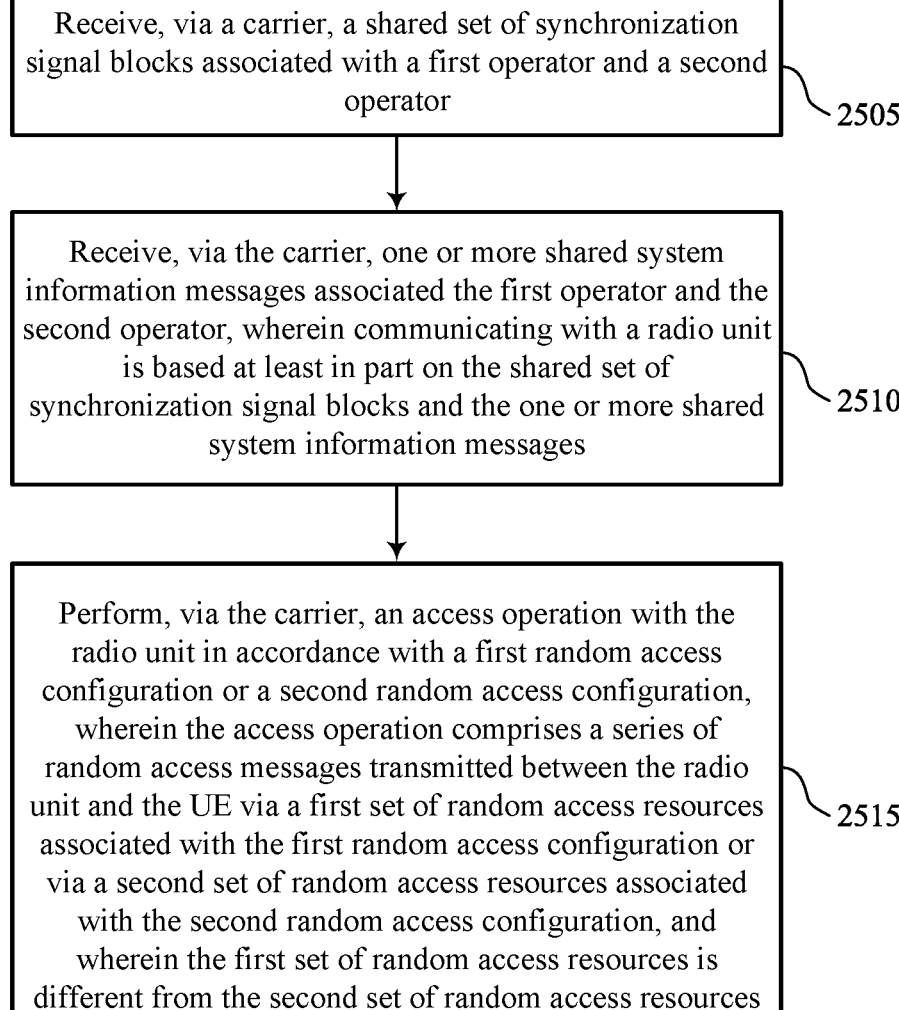

Receive, via a carrier, a shared set of synchronization signal blocks associated with a first operator and a second operator ⟍ 2505

Receive, via the carrier, one or more shared system information messages associated the first operator and the second operator, wherein communicating with a radio unit is based at least in part on the shared set of synchronization signal blocks and the one or more shared system information messages ⟍ 2510

Perform, via the carrier, an access operation with the radio unit in accordance with a first random access configuration or a second random access configuration, wherein the access operation comprises a series of random access messages transmitted between the radio unit and the UE via a first set of random access resources associated with the first random access configuration or via a second set of random access resources associated with the second random access configuration, and wherein the first set of random access resources is different from the second set of random access resources ⟍ 2515

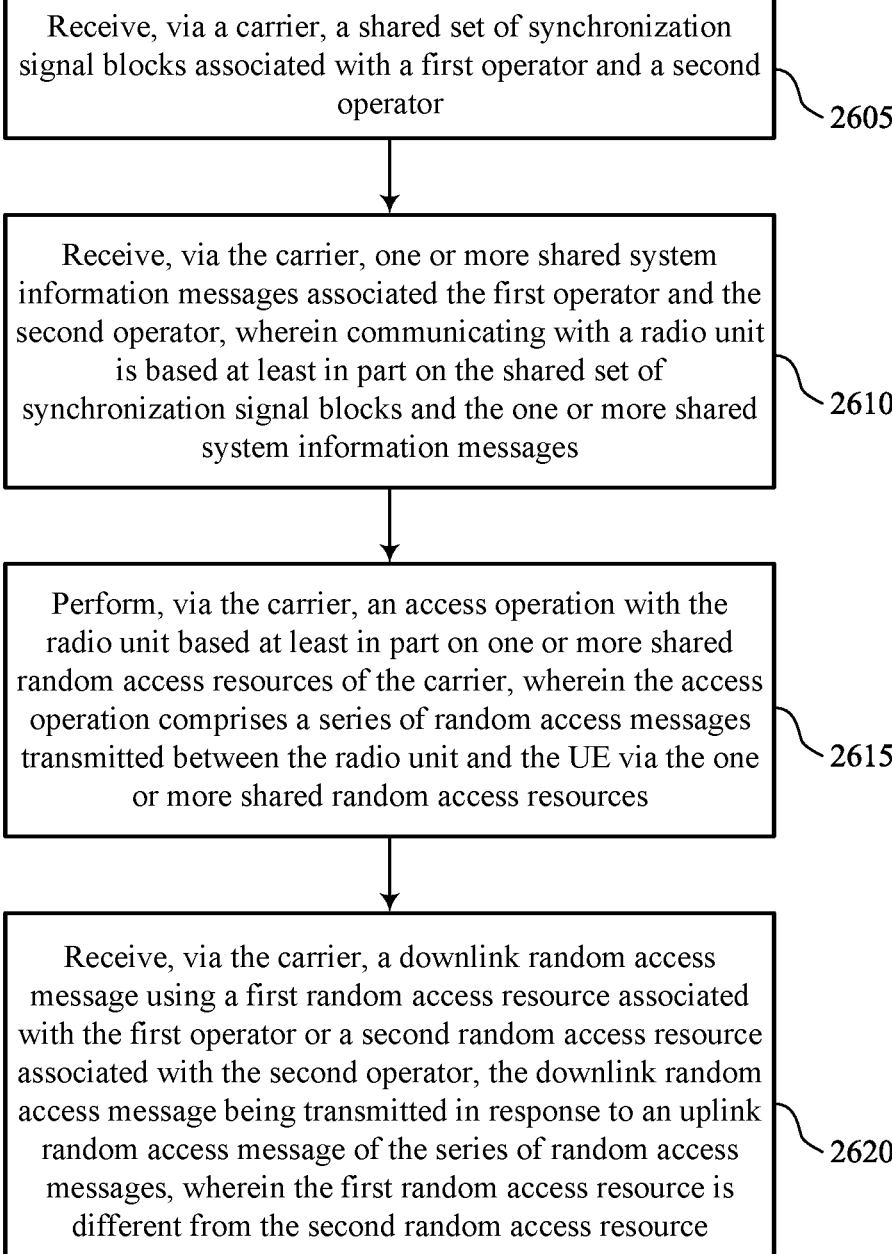

Receive, via a carrier, a shared set of synchronization signal blocks associated with a first operator and a second operator  — 2605

Receive, via the carrier, one or more shared system information messages associated the first operator and the second operator, wherein communicating with a radio unit is based at least in part on the shared set of synchronization signal blocks and the one or more shared system information messages  — 2610

Perform, via the carrier, an access operation with the radio unit based at least in part on one or more shared random access resources of the carrier, wherein the access operation comprises a series of random access messages transmitted between the radio unit and the UE via the one or more shared random access resources  — 2615

Receive, via the carrier, a downlink random access message using a first random access resource associated with the first operator or a second random access resource associated with the second operator, the downlink random access message being transmitted in response to an uplink random access message of the series of random access messages, wherein the first random access resource is different from the second random access resource  — 2620

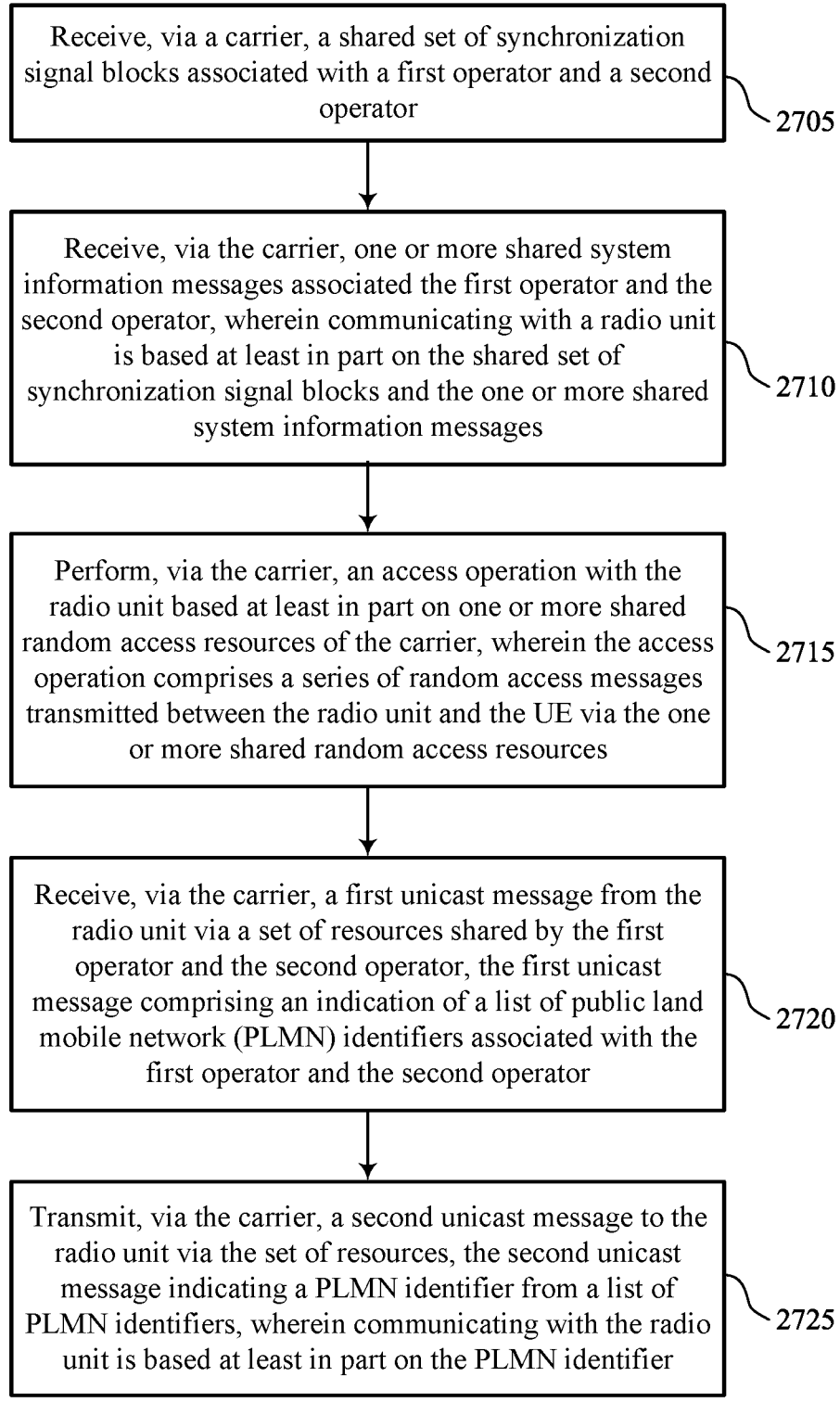

Receive, via a carrier, a shared set of synchronization signal blocks associated with a first operator and a second operator

2705

Receive, via the carrier, one or more shared system information messages associated the first operator and the second operator, wherein communicating with a radio unit is based at least in part on the shared set of synchronization signal blocks and the one or more shared system information messages

2710

Perform, via the carrier, an access operation with the radio unit based at least in part on one or more shared random access resources of the carrier, wherein the access operation comprises a series of random access messages transmitted between the radio unit and the UE via the one or more shared random access resources

2715

Receive, via the carrier, a first unicast message from the radio unit via a set of resources shared by the first operator and the second operator, the first unicast message comprising an indication of a list of public land mobile network (PLMN) identifiers associated with the first operator and the second operator

2720

Transmit, via the carrier, a second unicast message to the radio unit via the set of resources, the second unicast message indicating a PLMN identifier from a list of PLMN identifiers, wherein communicating with the radio unit is based at least in part on the PLMN identifier

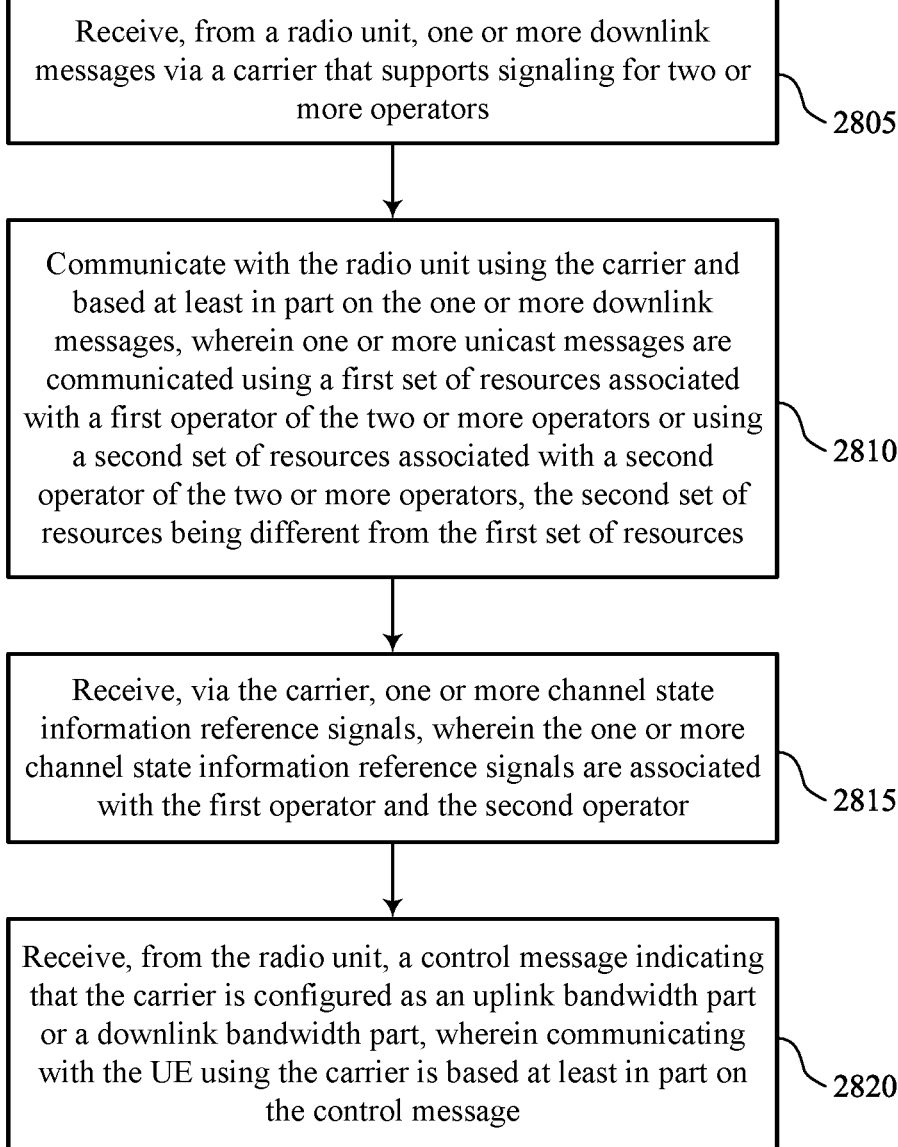

Receive, from a radio unit, one or more downlink messages via a carrier that supports signaling for two or more operators — 2805

Communicate with the radio unit using the carrier and based at least in part on the one or more downlink messages, wherein one or more unicast messages are communicated using a first set of resources associated with a first operator of the two or more operators or using a second set of resources associated with a second operator of the two or more operators, the second set of resources being different from the first set of resources — 2810

Receive, via the carrier, one or more channel state information reference signals, wherein the one or more channel state information reference signals are associated with the first operator and the second operator — 2815

Receive, from the radio unit, a control message indicating that the carrier is configured as an uplink bandwidth part or a downlink bandwidth part, wherein communicating with the UE using the carrier is based at least in part on the control message — 2820

DYNAMIC CARRIER SHARING TECHNIQUES FOR RADIO UNIT SHARING

FIELD OF TECHNOLOGY

The following relates to wireless communications, including dynamic carrier sharing techniques for radio unit sharing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support dynamic carrier sharing techniques for radio unit (RU) sharing. In accordance with various aspects, two or more different operators may share one or more RUs that provide over the air signaling for wireless communications with a user equipment (UE) or multiple UEs. In some aspects, the multiple different operators may share a same carrier that is provided by an RU, where the carrier may be dynamically shared between the multiple operators. In accordance with various techniques discussed herein, there may be coordination between operators regarding resource separation such that wireless resources associated with the shared carrier may be split between the operators using, for example, time-division multiplexing (TDM), frequency-division multiplexing (FDM), and/or spatial-division multiplexing (SDM). In some aspects, signal transmissions to and from the RU (e.g., using the carrier that supports multiple operators) may be based on a separation between certain physical layer (PHY) transmissions, where some transmissions to or from the RU may be common for the multiple operators, and other transmissions may use different sets of resources that are respectively associated with the different operators.

A method for wireless communications is described. The method may include transmitting, to a user equipment (UE) via a radio unit, one or more downlink messages using a carrier that supports signaling for two or more operators, where the one or more downlink messages are transmitted based on a separation of physical layer signaling for the two or more operators and communicating, via the radio unit, with the UE using the carrier, where one or more unicast messages are communicated using a first set of resources associated with a first operator of the two or more operators or using a second set of resources associated with a second operator of the two or more operators, the second set of resources being different from the first set of resources.

An apparatus for wireless communications is described. The apparatus may include a processor, memory coupled with the processor, and instructions stored in the memory. The instructions may be executable by the processor to cause the apparatus to transmit, to a UE via a radio unit, one or more downlink messages using a carrier that supports signaling for two or more operators, where the one or more downlink messages are transmitted based on a separation of physical layer signaling for the two or more operators and communicating, via the radio unit, with the UE used the carrier, where one or more unicast messages are communicated using a first set of resources associated with a first operator of the two or more operators or using a second set of resources associated with a second operator of the two or more operators, the second set of resources being different from the first set of resources.

Another apparatus for wireless communications is described. The apparatus may include means for transmitting, to a UE via a radio unit, one or more downlink messages using a carrier that supports signaling for two or more operators, where the one or more downlink messages are transmitted based on a separation of physical layer signaling for the two or more operators and means for communicating, via the radio unit, with the UE using the carrier, where one or more unicast messages are communicated using a first set of resources associated with a first operator of the two or more operators or using a second set of resources associated with a second operator of the two or more operators, the second set of resources being different from the first set of resources.

A non-transitory computer-readable medium storing code for wireless communications is described. The code may include instructions executable by a processor to transmit, to a UE via a radio unit, one or more downlink messages using a carrier that supports signaling for two or more operators, where the one or more downlink messages are transmitted based on a separation of physical layer signaling for the two or more operators and communicating, via the radio unit, with the UE used the carrier, where one or more unicast messages are communicated using a first set of resources associated with a first operator of the two or more operators or using a second set of resources associated with a second operator of the two or more operators, the second set of resources being different from the first set of resources.

Some examples of the method, apparatuses, and non-transitory computer-readable medium described herein may further include operations, features, means, or instructions for receiving, by a first network entity associated with the radio unit, one or more control messages indicating a configuration for separating resources for communicating with the UE using the carrier, where communicating with the UE may be based on the configuration.

In some examples of the method, apparatuses, and non-transitory computer-readable medium described herein, transmitting the one or more downlink messages may include operations, features, means, or instructions for transmitting a first set of synchronization signal blocks associated with the first operator in accordance with a first synchronization raster of the carrier and transmitting a second set of synchronization signal blocks associated with the second operator in accordance with a second synchronization raster that is different than the first synchronization raster of the carrier, the first set of synchronization signal blocks indicating a first initial bandwidth part of the carrier and the second set of synchronization signal blocks indicating a second initial bandwidth part of the carrier different from the first initial bandwidth part.

Some examples of the method, apparatuses, and non-transitory computer-readable medium described herein may further include operations, features, means, or instructions for transmitting, via the carrier, one or more first system information messages associated with the first operator and using a first set of resources and transmitting, via the carrier, one or more second system information messages associated with the second operator and using a second set of resources different from the first set of resources, where communicating with the UE using the carrier is based on transmitting the one or more first system information messages and the one or more second system information messages. In some examples of the method, apparatuses, and non-transitory computer-readable medium described herein, the one or more first system information messages and the one or more second system information messages each indicate a same time-division duplexing resource pattern, a same synchronization signal position, or both.

Some examples of the method, apparatuses, and non-transitory computer-readable medium described herein may further include operations, features, means, or instructions for performing, via the carrier, an access operation with the UE using a first set of random access resources associated with the first operator or a second set of random access resources associated with the second operator, the access operation including a series of random access messages between the radio unit and the UE via the first set of random access resources or the second set of random access resources, where the first set of random access resources are different from the second set of random access resources in the carrier. Some examples of the method, apparatuses, and non-transitory computer-readable medium described herein may further include operations, features, means, or instructions for transmitting, to the UE, a control message indicating that the carrier is configured as an uplink bandwidth part or a downlink bandwidth part, where communicating with the UE using the carrier is based on the control message.

In some examples of the method, apparatuses, and non-transitory computer-readable medium described herein, transmitting the one or more downlink messages may include operations, features, means, or instructions for transmitting, via the carrier, a shared set of synchronization signal blocks associated with the first operator and the second operator and transmitting, via the carrier, one or more shared system information messages associated the first operator and the second operator, where communicating with the UE is based on the shared set of synchronization signal blocks and the one or more shared system information messages. In some examples of the method, apparatuses, and non-transitory computer-readable medium described herein, the one or more shared system information messages include first information that is common to the first operator and the second operator and second information that is different for the first operator and the second operator.

Some examples of the method, apparatuses, and non-transitory computer-readable medium described herein may further include operations, features, means, or instructions for performing, via the carrier, an access operation with the UE based on a first random access configuration associated with the first operator or a second random access configuration associated with the second operator, the first random access configuration and the second random access configuration being indicated by a system information message of the one or more shared system information messages, where the access operation includes a series of access messages transmitted between the radio unit and the UE via a first set of random access resources associated with the first random access configuration or via a second set of random access resources associated with the second random access configuration, and where the first set of random access resources are different from the second set of random access resources.

Some examples of the method, apparatuses, and non-transitory computer-readable medium described herein may further include operations, features, means, or instructions for performing, via the carrier, an access operation with the UE based on one or more shared random access resources of the carrier, where the access operation includes a series of random access messages transmitted between the radio unit and the UE via the one or more shared random access resources and transmitting, via the carrier, a downlink random access message to the UE using a first random access resource associated with the first operator or a second random access resource associated with the second operator, the downlink random access message being transmitted in response to an uplink random access message of the series of random access messages, where the first random access resource is different from the second random access resource.

In some examples of the method, apparatuses, and non-transitory computer-readable medium described herein, the uplink random access message indicates a first public land mobile network (PLMN) identifier selected from a list of PLMN identifiers associated with the first operator and the second operator, where a system information message of the one or more shared system information messages indicates the list of PLMN identifiers. Some examples of the method, apparatuses, and non-transitory computer-readable medium described herein may further include operations, features, means, or instructions for forwarding the uplink random access message to a first network entity associated with the first operator or to a second network entity associated with the second operator based on the PLMN identifier, where transmitting the downlink random access message is based on forwarding the uplink random access message.

Some examples of the method, apparatuses, and non-transitory computer-readable medium described herein may further include operations, features, means, or instructions for performing, via the carrier, an access operation with the UE based on one or more shared random access resources of the carrier, where the access operation includes a series of random access messages transmitted between the radio unit and the UE via the one or more shared random access resources, transmitting, via the carrier, a first unicast message to the UE via a set of resources shared by the first operator and the second operator, the first unicast message including an indication of a list of PLMN identifiers associated with the first operator and the second operator, and receiving, via the carrier, a second unicast message from the UE via the set of resources, the second unicast message indicating a PLMN identifier from a list of PLMN identifiers, where communicating with the UE is based on the PLMN identifier.

In some examples of the method, apparatuses, and non-transitory computer-readable medium described herein, a system information message of the one or more shared system information messages includes a list of PLMN identifiers. Some examples of the method, apparatuses, and non-transitory computer-readable medium described herein may further include operations, features, means, or instructions for transmitting, via the carrier, one or more channel state information reference signals, where the one or more channel state information reference signals are associated with the first operator and the second operator. Some examples of the method, apparatuses, and non-transitory computer-readable medium described herein may further include operations, features, means, or instructions for receiving one or more sounding reference signals from the UE via the carrier and forwarding the one or more sounding reference signals to a first network entity associated with the first operator or to a second network entity associated with the second operator. In some examples of the method, apparatuses, and non-transitory computer-readable medium described herein, the radio unit operates in one or more unlicensed radio frequency spectrum bands, one or more radio frequency spectrum bands that may be shared by the first operator and the second operator, one or more licensed radio frequency spectrum bands, or any combination thereof.

A method for wireless communications at a UE is described. The method may include receiving, from a radio unit, one or more downlink messages via a carrier that supports signaling for two or more operators and communicating with the radio unit using the carrier and based on the one or more downlink messages, where one or more unicast messages are communicated using a first set of resources associated with a first operator of the two or more operators or using a second set of resources associated with a second operator of the two or more operators, the second set of resources being different from the first set of resources.

An apparatus for wireless communications at a UE is described. The apparatus may include a processor, memory coupled with the processor, and instructions stored in the memory. The instructions may be executable by the processor to cause the apparatus to receive, from a radio unit, one or more downlink messages via a carrier that supports signaling for two or more operators and communicate with the radio unit using the carrier and based on the one or more downlink messages, where one or more unicast messages are communicated using a first set of resources associated with a first operator of the two or more operators or using a second set of resources associated with a second operator of the two or more operators, the second set of resources being different from the first set of resources.

Another apparatus for wireless communications at a UE is described. The apparatus may include means for receiving, from a radio unit, one or more downlink messages via a carrier that supports signaling for two or more operators and means for communicating with the radio unit using the carrier and based on the one or more downlink messages, where one or more unicast messages are communicated using a first set of resources associated with a first operator of the two or more operators or using a second set of resources associated with a second operator of the two or more operators, the second set of resources being different from the first set of resources.

A non-transitory computer-readable medium storing code for wireless communications at a UE is described. The code may include instructions executable by a processor to receive, from a radio unit, one or more downlink messages via a carrier that supports signaling for two or more operators and communicate with the radio unit using the carrier and based on the one or more downlink messages, where one or more unicast messages are communicated using a first set of resources associated with a first operator of the two or more operators or using a second set of resources associated with a second operator of the two or more operators, the second set of resources being different from the first set of resources.

In some examples of the method, apparatuses, and non-transitory computer-readable medium described herein, receiving the one or more downlink messages may include operations, features, means, or instructions for receiving, via the carrier, a shared set of synchronization signal blocks associated with the first operator and the second operator and receiving, via the carrier, one or more shared system information messages associated the first operator and the second operator, where communicating with the radio unit is based on the shared set of synchronization signal blocks and the one or more shared system information messages. In some examples of the method, apparatuses, and non-transitory computer-readable medium described herein, the one or more shared system information messages include first information that is common to the first operator and the second operator and second information that is different for the first operator and the second operator.

In some examples of the method, apparatuses, and non-transitory computer-readable medium described herein, a system information message of the one or more shared system information messages includes a first random access configuration associated with the first operator and a second random access configuration associated with the second operator and the method, apparatuses, and non-transitory computer-readable medium may include further operations, features, means, or instructions for performing, via the carrier, an access operation with the radio unit in accordance with the first random access configuration or the second random access configuration, where the access operation includes a series of random access messages transmitted between the radio unit and the UE via a first set of random access resources associated with the first random access configuration or via a second set of random access resources associated with the second random access configuration, and where the first set of random access resources is different from the second set of random access resources.

Some examples of the method, apparatuses, and non-transitory computer-readable medium described herein may further include operations, features, means, or instructions for performing, via the carrier, an access operation with the radio unit based on one or more shared random access resources of the carrier, where the access operation includes a series of random access messages transmitted between the radio unit and the UE via the one or more shared random access resources and receiving, via the carrier, a downlink random access message using a first random access resource associated with the first operator or a second random access resource associated with the second operator, the downlink random access message being transmitted in response to an uplink random access message of the series of random access messages, where the first random access resource is different from the second random access resource.

In some examples of the method, apparatuses, and non-transitory computer-readable medium described herein, the uplink random access message indicates a first PLMN identifier selected from a list of PLMN identifiers associated with the first operator and the second operator, where a system information message of the one or more shared system information messages indicates the list of PLMN identifiers.

Some examples of the method, apparatuses, and non-transitory computer-readable medium described herein may further include operations, features, means, or instructions for performing, via the carrier, an access operation with the radio unit based on one or more shared random access resources of the carrier, where the access operation includes a series of random access messages transmitted between the radio unit and the UE via the one or more shared random access resources, receiving, via the carrier, a first unicast message from the radio unit via a set of resources shared by the first operator and the second operator, the first unicast message including an indication of a list of PLMN identifiers associated with the first operator and the second operator, and transmitting, via the carrier, a second unicast message to the radio unit via the set of resources, the second unicast message indicating a PLMN identifier from a list of PLMN identifiers, where communicating with the radio unit is based on the PLMN identifier.

In some examples of the method, apparatuses, and non-transitory computer-readable medium described herein, a system information message of the one or more shared system information messages includes a list of PLMN identifiers and the method, apparatuses, and non-transitory computer-readable medium may include further operations, features, means, or instructions for refraining from performing an access operation with the radio unit based on the list of PLMN identifiers. Some examples of the method, apparatuses, and non-transitory computer-readable medium described herein may further include operations, features, means, or instructions for receiving, via the carrier, one or more channel state information reference signals, where the one or more channel state information reference signals are associated with the first operator and the second operator. Some examples of the method, apparatuses, and non-transitory computer-readable medium described herein may further include operations, features, means, or instructions for receiving, from the radio unit, a control message indicating that the carrier may be configured as an uplink bandwidth part or a downlink bandwidth part, where communicating with the UE using the carrier is based on the control message.

BRIEF DESCRIPTION OF THE DRAWINGS

FIGS. 18 through 28 show flowcharts illustrating methods that support dynamic carrier sharing techniques for RU sharing in accordance with one or more aspects of the present disclosure.

DETAILED DESCRIPTION

Figure 1:
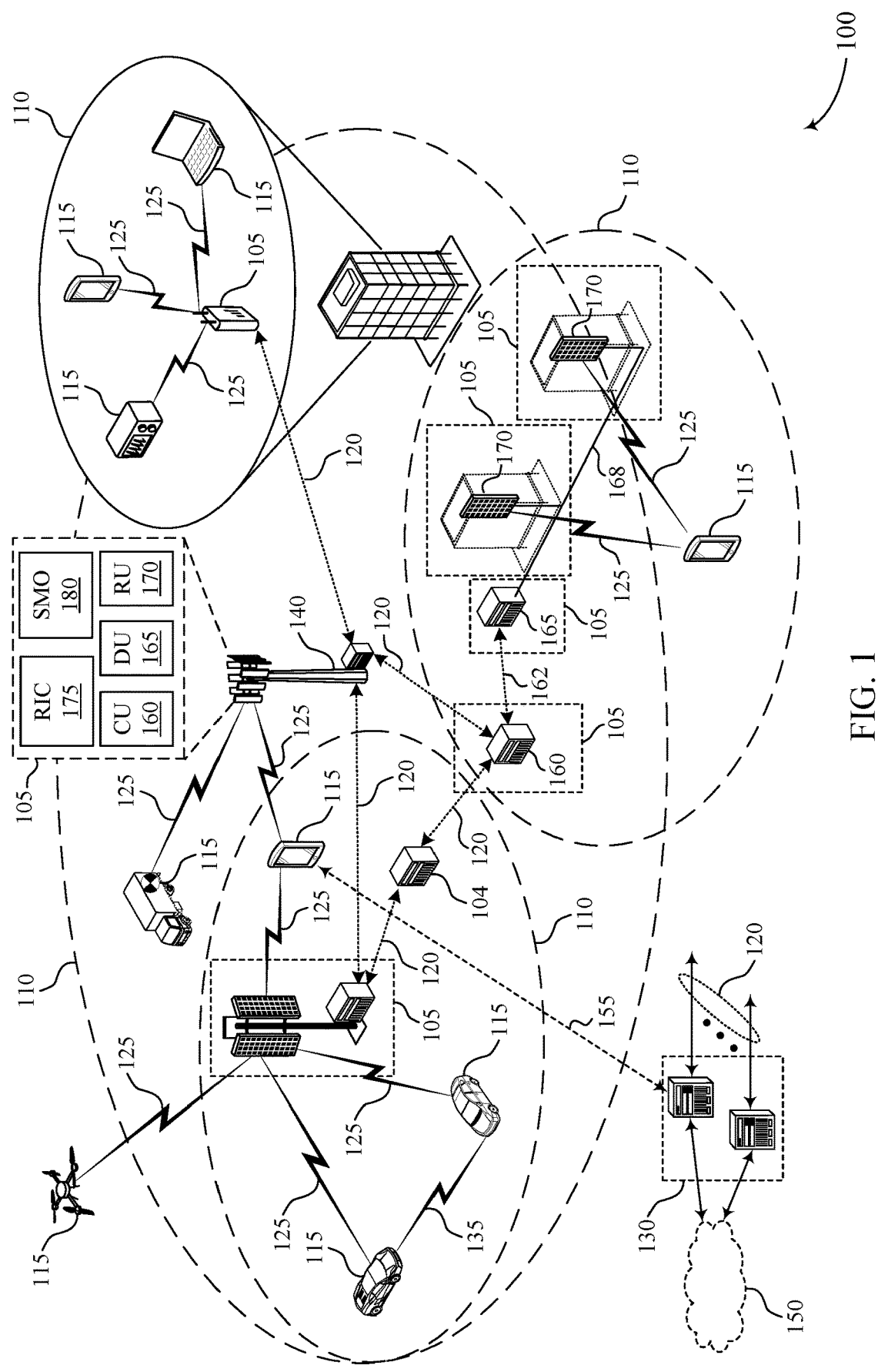
FIG. 1 illustrates an example of a wireless communications system that supports dynamic carrier sharing techniques for radio unit (RU) sharing in accordance with one or more aspects of the present disclosure.

In some wireless communications system deployments, various network entities may be used to facilitate wireless communications with at least one user equipment (UE). For example, multiple radio units (RUs) or remote radio heads (RRHs) may be provided for an area and may host lower protocol layers for wireless communications, such as layer 1 (L1) (e.g., physical (PHY) layer) or L2 (e.g., radio link control (RLC) layer, medium access control (MAC) layer) functionality and signaling. The RUs may be at least partially controlled by an associated central unit (CU) and/or other network entities that provide higher protocol layers (e.g., L3 and higher protocol layers). In some cases, multiple operators may have access to one or more RUs (e.g., one or more RUs may be provided by a facility manager at a sports venue and made available to multiple operators via one or more high capacity backhaul connections). Such shared RUs may provide substantial savings on deployment and operational costs. Efficient mechanisms for coordination between operators to effectively utilize carriers of a shared RU are thus desirable to enhance system efficiency and user experience.

Various aspects discussed herein relate to coordinating sharing of RUs by multiple different operators. In some aspects, an RU may operate using a single carrier that is dynamically shared between multiple operators. In such cases, there may be coordination between operators regarding resource separation such that the resources may be split between the operators using, for example, time-division multiplexing (TDM), frequency-division multiplexing (FDM), and/or spatial-division multiplexing (SDM). Here, the coordination between operators may be semi-static or dynamic, and may utilize dedicated signaling (e.g., backhaul signaling) that supports the coordination.

In some aspects, signal transmissions to and from the RU (e.g., using the carrier that supports multiple operators) may be based on a separation between certain physical layer (PHY) transmissions, where some transmissions to or from the RU may be common for the multiple operators, whereas other transmissions may use different sets of resources that are respectively associated with the different operators. As an example, there may be a full separation of messages sent to and from the RU for each operator, and respective sets of messages (e.g., including synchronization signal blocks (SSB), system information messages (e.g., remaining minimum system information (RMSI), other system information (OSI)), random access messages, unicast messages) may each be sent separately for each operator and via different resources. Additionally, or alternatively, there may be some partial separation of PHY messages transmitted to and from the RU (e.g., PHY transmissions may be common for SSBs and RMSI, but may be split for physical random access channel (PRACH) messaging, among other examples).

Various techniques discussed herein may thus provide for efficient utilization of one or more RUs that are shared by multiple different operators. Such techniques may provide for lower cost deployments through reduced duplication of network hardware by multiple operators, enhanced efficiency across operators through shared signaling that is common between operators that share an RU, enhanced data throughput and reduced power consumption through shared signaling and hardware, and enhanced user experiences.

Aspects of the disclosure are initially described in the context of wireless communications systems. Aspects of the disclosure are further illustrated by and described with reference to physical layer configurations at shared RUs, shared resources of shared RUs, process flows, apparatus diagrams, system diagrams, and flowcharts that relate to dynamic carrier sharing techniques for RU sharing.

FIG. 1 illustrates an example of a wireless communications system 100 that supports dynamic carrier sharing techniques for RU sharing in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support dynamic carrier sharing techniques for RU sharing as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, an RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of Ts=1/ $(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some cases, to efficiently utilize available system resources in the wireless communication system 100, multiple operators may build RUs 170 to serve the same area. To save on deployment and operational costs associated with building multiple RUs 170, a single RU 170 may be shared by multiple operators. Thus, techniques for coordination between operators to effectively utilize the shared resources of the single RU 170 may be beneficial to provide for efficient use of shared resources hardware.

In some aspects, an RU 170 may operate using a single carrier that is dynamically shared between multiple operators. In such cases, there may be coordination between operators regarding resource separation such that the resources may be split between the operators using, for example, TDM, FDM, and/or SDM. In some cases, coordination between operators may be semi-static or dynamic, and may utilize dedicated signaling (e.g., backhaul signaling) that supports the coordination.

In some aspects, signal transmissions to and from the RU 170 (e.g., using the carrier that supports multiple operators) may be based on a separation between certain PHY transmissions, where some transmissions to or from the RU 170 may be common for the multiple operators, whereas other transmissions may use different sets of resources that are respectively associated with the different operators. As an example, there may be a full separation of messages sent to and from the RU 170 for each operator, and respective sets of messages (e.g., including SSBs), system information messages (e.g., RMSI, OSI, RACH messages, unicast messages) may each be sent separately for each operator and via different resources. Additionally, or alternatively, there may be some partial separation of PHY messages transmitted to and from the RU 170 (e.g., PHY transmissions may be common for SSBs and RMSI, but may be split for RACH messaging, among other examples).

Figure 2:
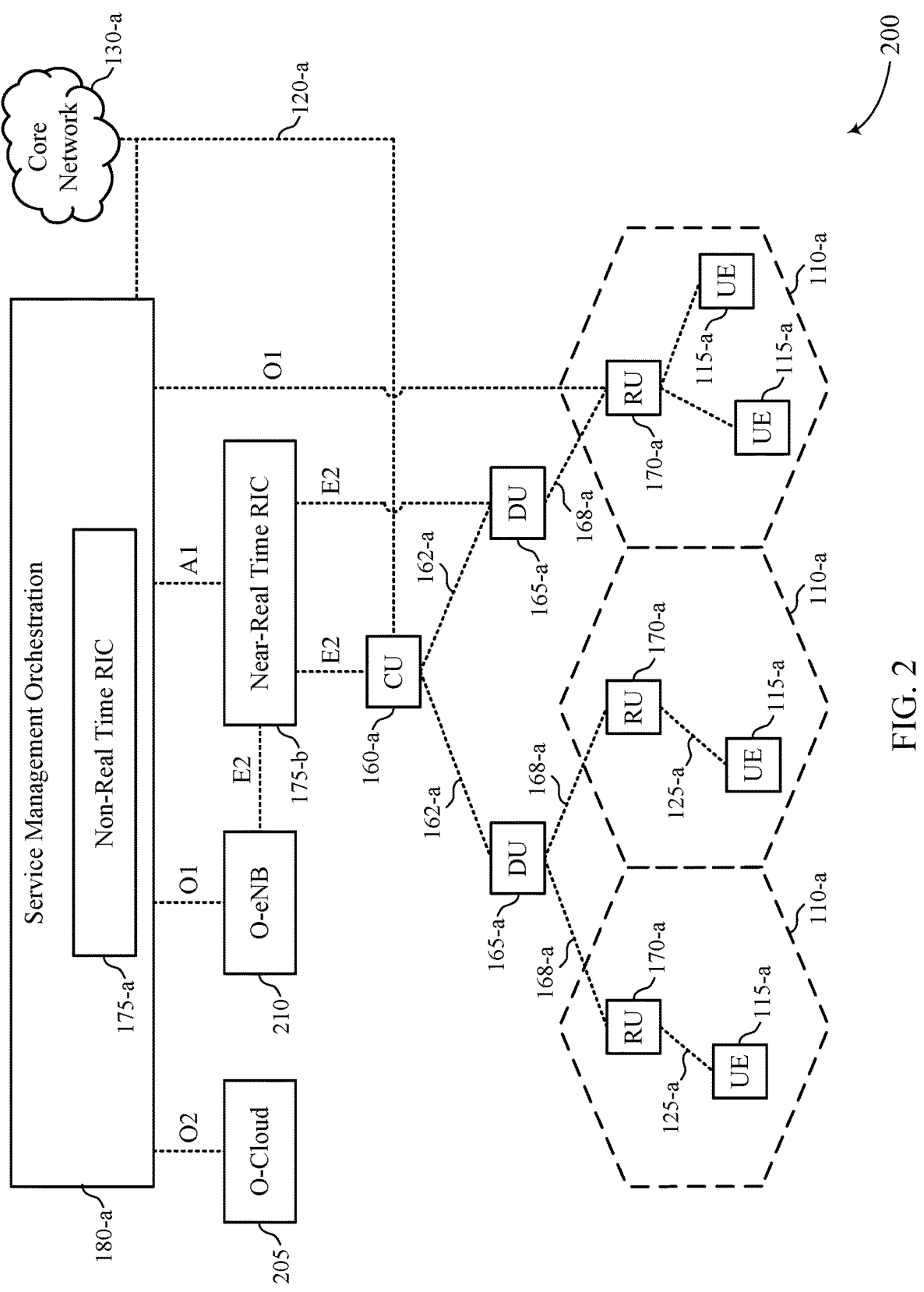
FIG. 2 illustrates an example of a network architecture that supports dynamic carrier sharing techniques for RU sharing in accordance with one or more aspects of the present disclosure.

FIG. 2 illustrates an example of a network architecture 200 (e.g., a disaggregated base station architecture, a disaggregated RAN architecture) that supports dynamic carrier sharing techniques for RU sharing in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., AI policies).

Figure 3:
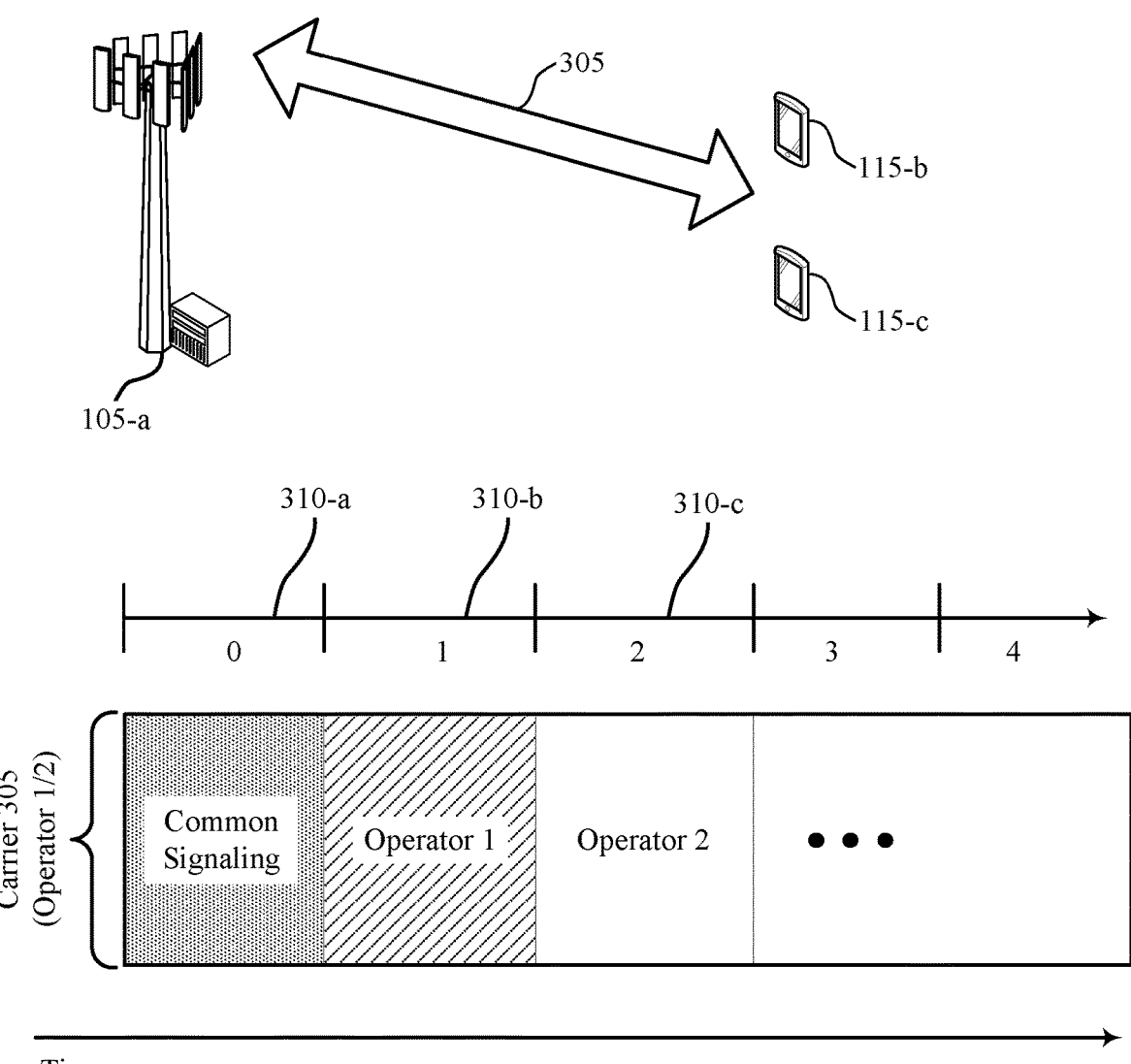
FIG. 3 illustrates an example of a wireless communications system that supports dynamic carrier sharing techniques for RU sharing in accordance with one or more aspects of the present disclosure.

In accordance with various aspects as discussed herein, one or more RUs 170-*a* may be shared by two or more different operators. In particular, a single RU 170-*a* may be associated with communications that are associated with two or more operators. In such cases, the multiple different operators may share a same carrier that is provided by a shared RU 170-*a*, where the carrier may be dynamically shared between the multiple operators. Coordination between operators regarding resource separation may be provided such that wireless resources associated with the shared carrier may be split between the operators using, for example, TDM, FDM, and/or SDM. As discussed herein, in some aspects signal transmissions to and from a shared RU 170-*a* may be based on a separation between certain PHY transmissions, in which some transmissions to or from the RU 170-*a* may be common for the multiple operators, and other transmissions may use different sets of resources that are respectively associated with the different operators FIG. 3 illustrates an example of a wireless communications system 300 that supports dynamic carrier sharing techniques for RU sharing in accordance with one or more aspects of the present disclosure. The wireless communications system 300 may implement, or be implemented by, aspects of the wireless communications system 100 or the network architecture 200. For example, the wireless communications system 300 may include a network entity 105-*a*, and one or more UEs 115 (e.g., the UE 115-*b* and the UE 115-*c*), which may be examples of corresponding devices described with reference to FIGS. 1-2.

As discussed herein, multiple operators, such as a first operator (operator 1) and a second operator (operator 2), may send communication signals via one or more carrier 305 to service one or more UEs 115 (e.g., a first UE 115-*b* and a second UE 115-*c*). To efficiently utilize system resources while serving UEs 115 located within a coverage area, the operators (e.g., associated with respective network entities 105) may share a single RU (e.g., corresponding to the network entity 105-*a*). That is, two or more operators may share an RU to efficiently serve respective UEs 115.

In some examples, the shared RU may provide sharing for carrier 305, such that each operator uses the carrier 305 for communications with the respective UEs 115. The shared carrier 305 may be used to provide common signaling for the carrier that applies to each operator that uses the carrier 305, as well as operator-specific signaling such as control information or data that is operator-specific. In the example of FIG. 3. sharing of carrier 305 is provided through TDM, in which different operators use different time intervals 310. It is to be understood that the TDM example in FIG. 3 is provided for purposes of illustration and discussion, and other multiplexing techniques for carrier 305 may be implemented in addition to, or alternatively to, the time-domain techniques in this example. For example, wireless resources associated with the shared carrier may be split between the operators using, TDM, FDM, SDM, or any combinations thereof.

In some cases, signal transmissions to and from the RU via carrier 305 may be based on a separation between certain PHY transmissions, where some transmissions to or from the RU may be common for the multiple operators (e.g., common signaling provided in first time interval 310-*a*), and other operator-specific transmissions may use different sets of resources that are respectively associated with the different operators, such as second time interval 310-*b* for operator 1 transmissions and third time interval 310-*c* for operator 2. In some cases, when using TDD, the multiple operators may align uplink and downlink communications (e.g., via coordination signaling). Further, the different operators may also coordinate resource separation of the wireless resources of carrier 305 (e.g., via backhaul communications between network entities, such as scheduling entities, of the different operators). As discussed, the wireless resources of carrier 305 may be split between operators using TDM, FDM, SDM, or combinations thereof. The coordination between operators may provide semi-static or dynamic coordination of the wireless resources. For example, for dynamic coordination, dynamic backhaul signaling between operators may support resource coordination, or a dedicated coordinator (e.g., an entity such as the RU itself, a DU, a CU, or other entity) may provide resource allocations to schedulers of each operator. In any case, some messaging between operators and/or to an entity such as the RU may enable two or more operators to coordinate the shared use of the RU and the carrier 305 associated with the RU, including how and when signaling is sent to/from UEs of respective operators.

In some cases, such a shared RU may be implemented in multiple deployment scenarios. For example, a shared RU may operate in an unlicensed radio frequency spectrum band and provide service to multiple operators, may operate in a radio frequency spectrum band that is shared such that multiple operators agree to share the carrier 305 using a shared RU, or may operate in a licensed band owned by one operator that allows other operators to access the carrier 305 via the RU (e.g., an operator may provide a percentage or wireless resources of one or more carriers 305 to another operator for a fee or based on a reciprocal relationship with the other operator). In some deployments, an RU owner may control access to a particular area (e.g., a sports stadium or other venue in which access to the area is controlled), and may install multiple RUs that are accessible by two or more different operators (e.g., for a fee) to serve a relatively large quantity of users that may be present in the area.

In accordance with various techniques discussed herein, signal transmissions using the shared carrier 305 via a shared RU may use resources that are dynamically shared among different operators. In such cases, for operator-specific unicast traffic, a transmission is operator-specific and is not shared, and each operator may use specific resources for unicast data traffic and control information (e.g., via physical downlink control channel (PDCCH), physical downlink shared channel (PDSCH), physical uplink control channel (PUCCH), physical uplink shared channel (PUSCH), or any combinations thereof). As discussed, resources for such operator-specific communications may be split between the operators using one or more multiplexing techniques (e.g., TDM, FDM, SDM). In some cases, some communications signals or channels (e.g., SSB, physical random access channel (PRACH), channel state information (CSI) reference signal (RS), sounding reference signal (SRS), broadcast PDCCH/PDSCH, and the like), may be common among the multiple operators, and common PHY transmissions may be used for multiple operators. Such PHY transmissions may be separated according to multiple different techniques, several examples of which are discussed in more detail with reference to FIGS. 4 through 8. Further, in some cases, one or more reference signals may be shared across operators. For example, for CSI-RS for channel acquisition or beam management, a CSI-RS may be shared between multiple operators, as the same over-the-air channels are measured. In such cases, the operators and RU may coordinate reference signal transmissions (e.g., periodic CSI-RS may be coordinated with CSI reports shared amongst operators). Additionally, or alternatively, SRS may be shared, where the RU may process SRS, or forward SRS to a DU to process, with information shared among operators.

Figure 4:
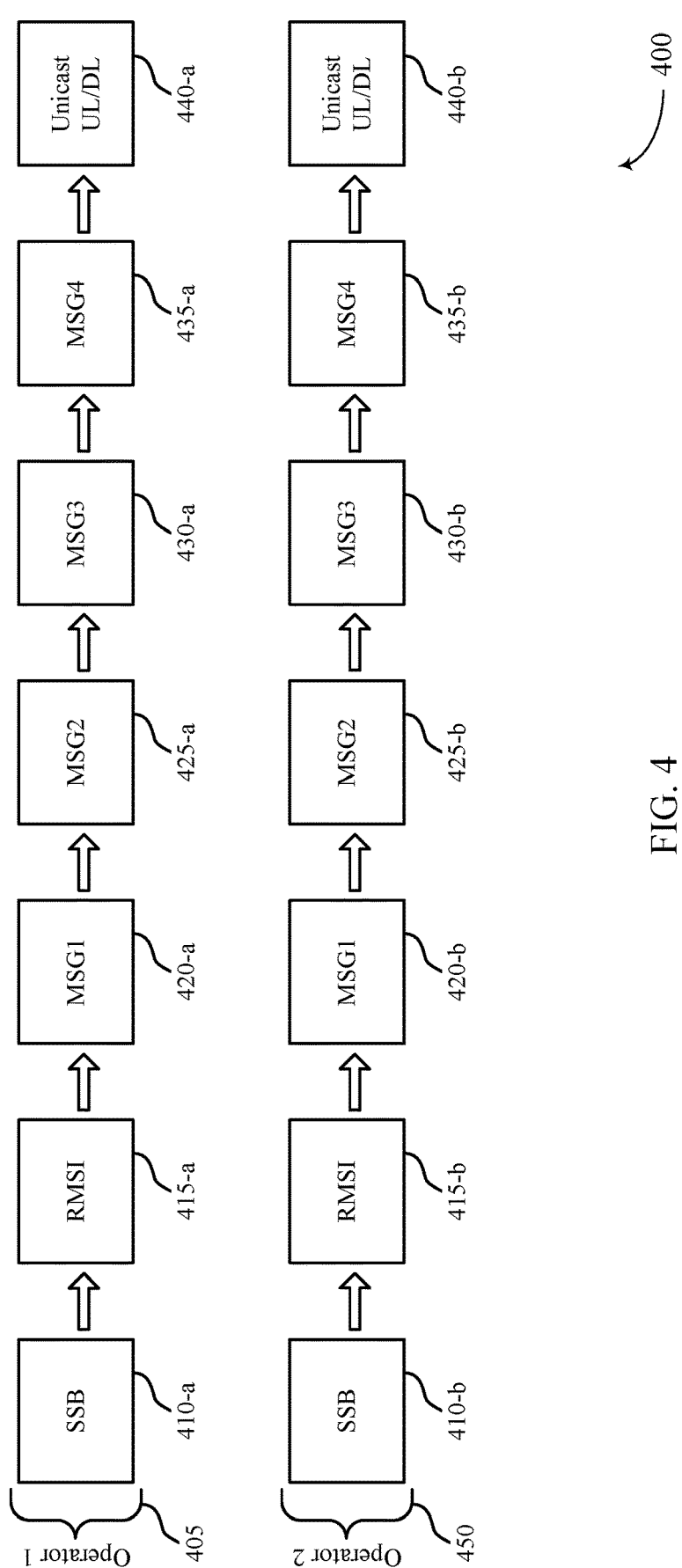
FIG. 4 illustrates an example of a physical layer signaling separation that supports dynamic carrier sharing techniques for RU sharing in accordance with one or more aspects of the present disclosure.

FIG. 4 illustrates an example of physical layer signaling separation 400 that supports dynamic carrier sharing techniques for RU sharing in accordance with one or more aspects of the present disclosure. The physical layer signaling separation 400 may be implemented by aspects of the wireless communications systems 100 or 300, or the network architecture 200. For example, PHY signaling according to physical layer signaling separation 400 may be implemented by network entity 105 (e.g., an RU) and one or more UEs 115, which may be examples of corresponding devices described with reference to FIGS. 1-3.

In some examples, multiple operators may coordinate with each other (e.g., to indicate resources over which different operators may use a shared carrier). The operators may coordinate via the shared RU, or via a neutral entity (e.g., another network entity 105, or any other network node), which may act as a moderator for the coordinating operators. In some examples, the operators may communicate via backhaul signaling, such as CU to CU communication, RU to RU communication, DU to DU communication (e.g., as described in greater detail with reference to FIG. 2), or any combination thereof. In some examples, the operators may perform dynamic or semi-static coordination.

As discussed herein, in some cases there may be a full separation of messages sent to and from the RU for each operator. In the example of FIG. 4, a first operator 405 and a second operator 450 may each provide separate PHY signaling and respective sets of messages. For example, the first operator 405 may provide PHY signaling that includes a SSB 410-a, RMSI 415-a, a series of access messages (e.g., RACH messages including RACH MSG1 420-a, MSG2 425-a, MSG3 430-a, and MSG4 435-a), and unicast uplink/downlink messages 440-a. Likewise, in this example, the second operator 450 may provide PHY signaling that includes a SSB 410-b, RMSI 415-b, a series of access messages (e.g., RACH messages including RACH MSG1 420-b, MSG2 425-b, MSG3 430-b, and MSG4 435-b), and unicast uplink/downlink messages 440-b. In such examples the PHY signaling for the first operator 405 and the second operator 450 may each be sent separately via different resources. Further, in such cases, CSI-RS may be separately transmitted, and SRS may be separately configured and processed for each operator.

Thus, in such implementations, the wireless resources of the shared carrier used by the two operators are orthogonalized (e.g., using TDM, FDM, and/or SDM). In some cases, wireless resources may be split according to a static or semi-static configuration, such as resources for individual SSB sweeping, PRACH, RMSI, SPS, configured grant (CG) PUSCH, periodic CSI-RS, periodic SRS, or any combinations thereof. Further, some wireless resources may be dynamically split, such as for dynamic signals (e.g., aperiodic reference signals, some broadcast transmissions). In some cases, a network entity that coordinates resource sharing (e.g., the RU, a DU, a CU) may also implement over-booking and dropping, if orthogonalizing the resources (e.g., if coordination is slow or difficult to implement). In examples that provide separate signaling, initial access resources may be shared such as according to the example as discussed with reference to FIG. 5. While such techniques may provide relatively simple implementation, various duplicated transmissions (e.g., SSB, RMSI) may, in some cases, result in an inefficient use of resources, and various other aspects discussed herein may use some common signaling that is shared among operators, such as discussed with reference to FIGS. 6 through 8, for example.

Figure 5:
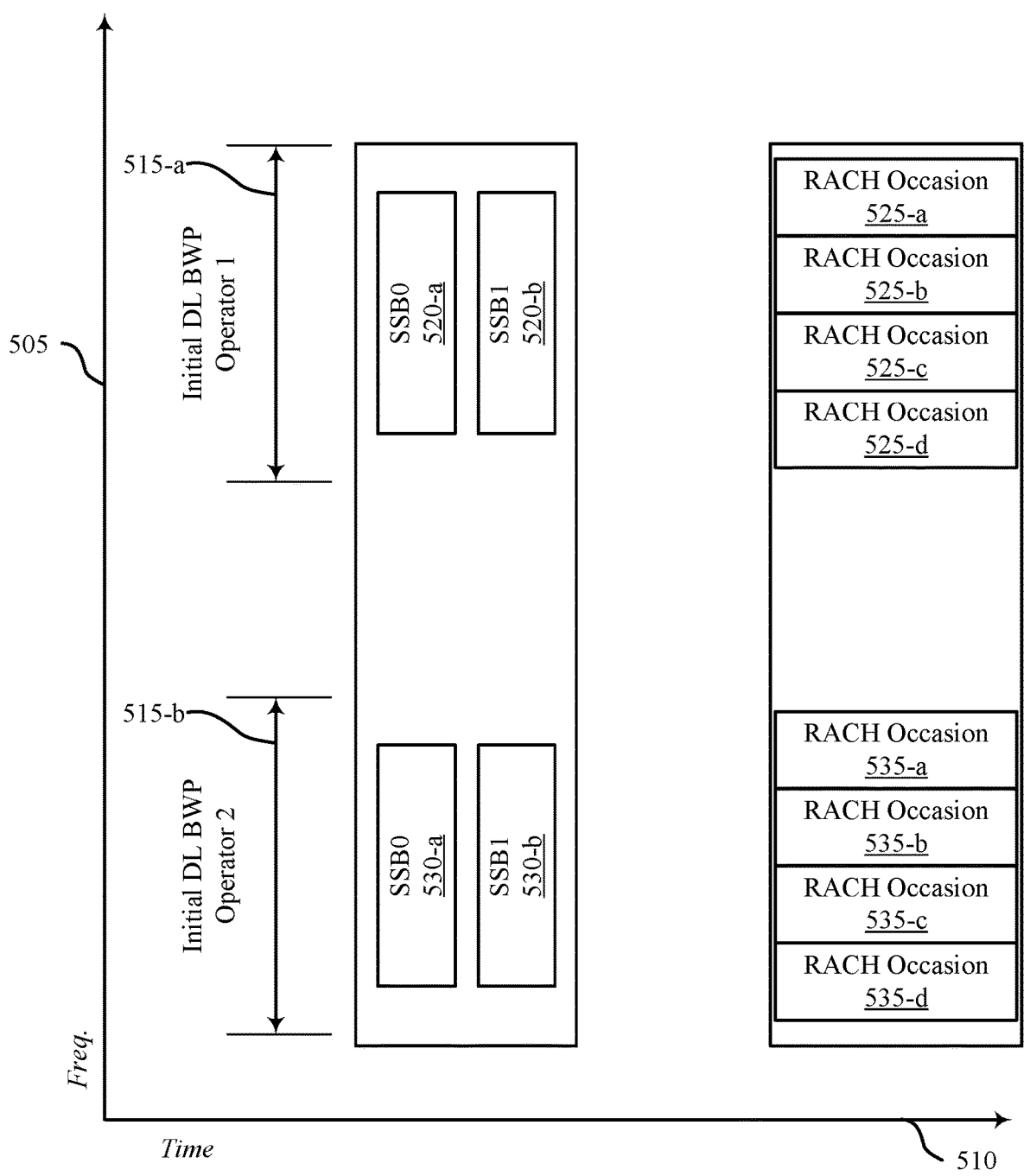
FIG. 5 illustrates an example of operator frequency resources that supports dynamic carrier sharing techniques for RU sharing in accordance with one or more aspects of the present disclosure.

FIG. 5 illustrates an example of operator frequency resources 500 that support dynamic carrier sharing techniques for RU sharing in accordance with one or more aspects of the present disclosure. The operator frequency resources 500 may be implemented by aspects of the wireless communications systems 100 or 300, or the network architecture 200. For example, signaling using operator frequency resources 500 may be implemented by network entity 105 (e.g., an RU) and one or more UEs 115, which may be examples of corresponding devices described with reference to FIGS. 1 through 3.

In this example, a shared carrier may use frequency resources 505 and time resources 510. Different operators, such as operator 1 and operator 2, may use different initial downlink bandwidth parts (BWPs) 515. In the example of FIG. 5, operator 1 may use a first initial downlink BWP 515-a for associated SSBs 520, such as SSB0 520-a and SSB1 520-b. Operator 2 may use a second initial downlink BWP 515-b for associated SSBs 530, such as SSB0 530-a and SSB1 530-b. For example, the different operators may place their associated SSBs 520, 530, at different synchronization rasters in the carrier, which may point to the associated different initial downlink BWP 515. Further, separate RMSI may be transmitted for each operator.

In some cases, the SSBs 520, 530, may be transmitted using a same TDD uplink/downlink pattern, and may use a same position in an SSB burst. Further, RACH resources may be separated, with operator 1 using a first set of RACH occasions 525 (e.g., RACH occasions 525-*a* through 525-*d* in different frequency resources), and operator 2 using a second set of RACH occasions 535 (e.g., RACH occasions 535-*a* through 535-*d* in different frequency resources). In some cases, a same PRACH configuration may be used by each operator, with the RACH occasions 525, 535, multiplexed using FDM. Subsequent to an initial access procedure between a UE and the shared RU, the carrier (e.g., the entire carrier) may be configured as one BWP, with each operator using different resources within the carrier, such that the carrier may be shared (e.g., using TDM, FDM, SDM techniques). As discussed, such separation of PHY signaling may result in duplication of some information that may be common between the multiple carriers, and in accordance with other aspects some shared PHY signaling may be used, such as discussed in various examples with reference to FIGS. 6 through 8.

Figure 6:
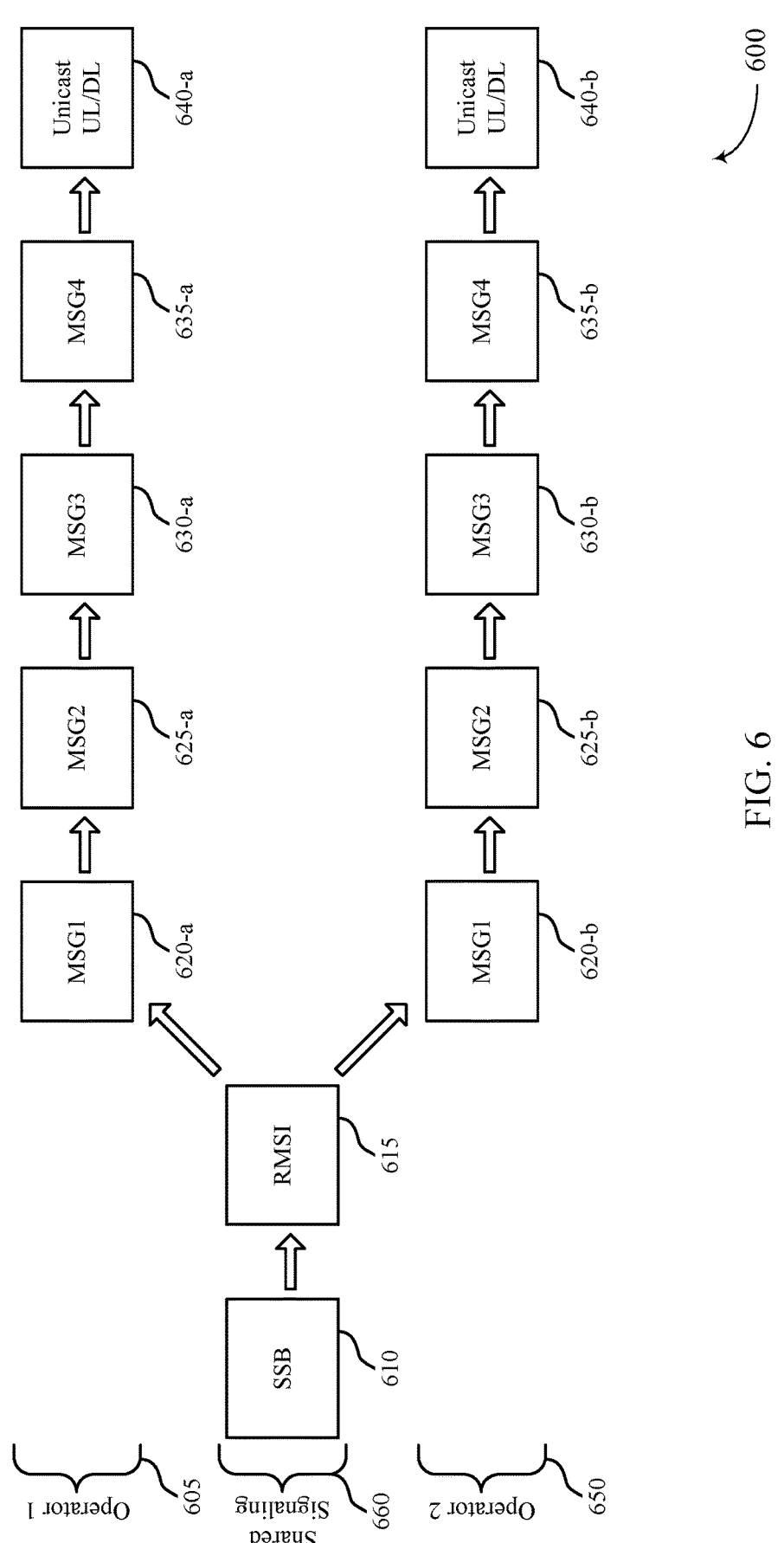
FIGS. 6 through 8 illustrate further examples of physical layer signaling separation that support dynamic carrier sharing techniques for RU sharing in accordance with one or more aspects of the present disclosure.

FIG. 6 illustrates an example of a physical layer signaling separation 600 that supports dynamic carrier sharing techniques for RU sharing in accordance with one or more aspects of the present disclosure. The physical layer signaling separation 600 may be implemented by aspects of the wireless communications systems 100 or 300, or the network architecture 200. For example, PHY signaling according to physical layer signaling separation 600 may be implemented by network entity 105 (e.g., an RU) and one or more UEs 115, which may be examples of corresponding devices described with reference to FIGS. 1-3.

As discussed herein, in some cases multiple operators may coordinate with each other (e.g., to indicate resources over which different operators may use a shared carrier). The operators may coordinate via the shared RU, or via a neutral entity (e.g., another network entity 105, or any other network node), which may act as a moderator for the coordinating operators. In some examples, the operators may communicate via backhaul signaling, such as CU to CU communication, RU to RU communication, DU to DU communication (e.g., as described in greater detail with reference to FIG. 2), or any combination thereof. In some examples, the operators may perform dynamic or semi-static coordination.

In the example of FIG. 6, a partial separation of PHY signaling messages may be sent to and from the RU for each operator, with shared signaling 660 that provides common PHY signaling for SSB 610 and RMSI 615, and split PHY signaling after RMSI 615. For example, after RMSI 615, the first operator 605 may provide PHY signaling that includes RACH messages that are part of a series of access messages (e.g., RACH MSG1 620-*a*, MSG2 625-*a*, MSG3 630-*a*, and MSG4 635-*a*), and unicast uplink/downlink messages 640-*a*. Likewise, in this example, the second operator 650 may provide PHY signaling that includes RACH messages that are part of a series of access messages (e.g., RACH MSG1 620-*b*, MSG2 625-*b*, MSG3 630-*b*, and MSG4 635-*b*), and unicast uplink/downlink messages 640-*b*.

Accordingly, for such a shared RU and shared carrier, duplicated SSBs 610 and RMSI 615 between two operators is eliminated, thus saving resources and enhancing efficiency. In this example, a physical broadcast channel (PBCH) of the SSB 610 may points to the RMSI 615 PDCCH reception, and the RMSI 615 may carry common information for both operators as well as separate information for each operator. For example, RMSI 615 may carry two PRACH configurations, one for each operator, where the PRACH resources for the two operators are orthogonal. The UE may pick one PRACH configuration based on the operator information for RACH operations.

Figure 7:
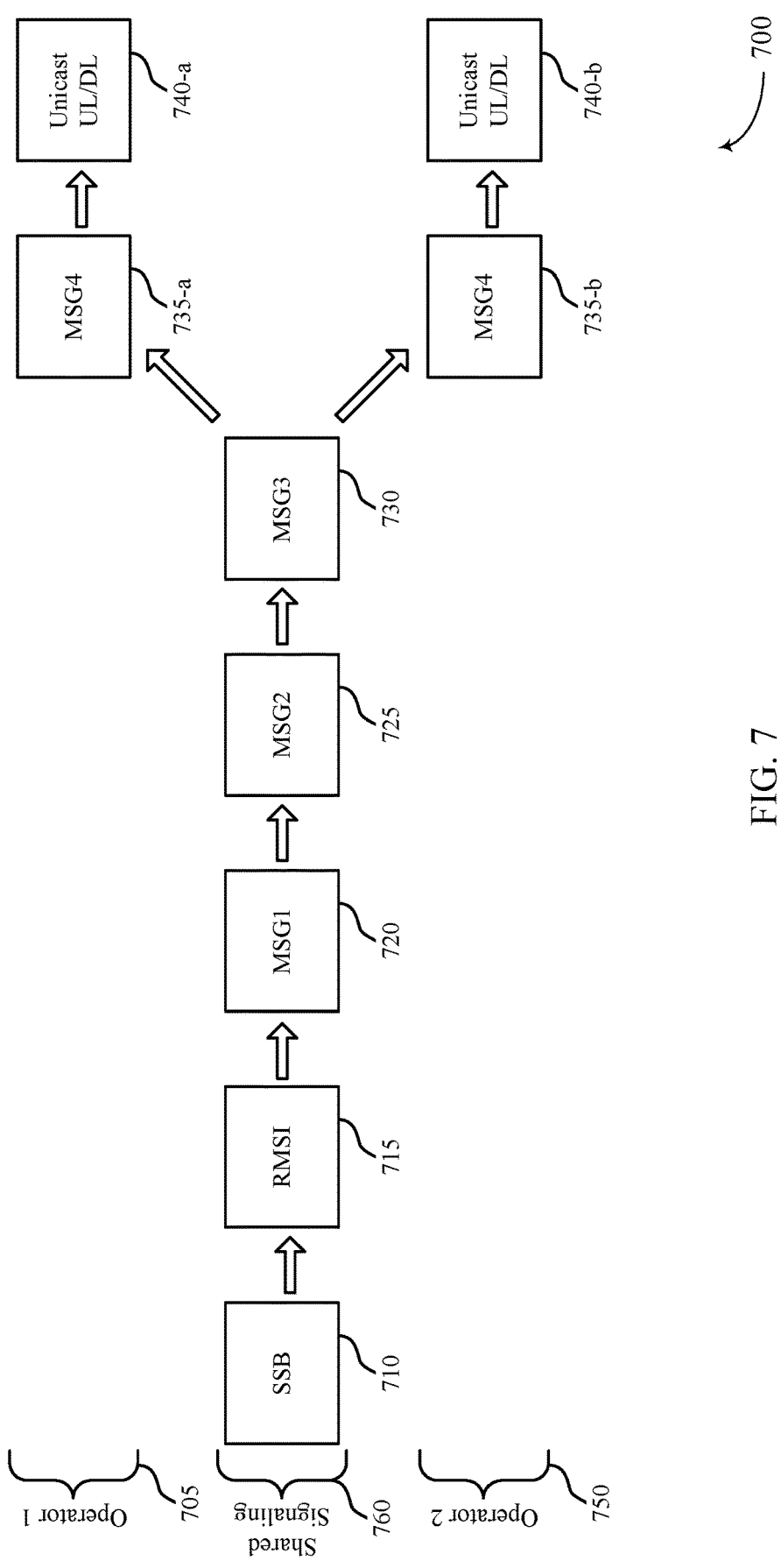

FIG. 7 illustrates another example of physical layer signaling separation 700 that supports dynamic carrier sharing techniques for RU sharing in accordance with one or more aspects of the present disclosure. The physical layer signaling separation 700 may be implemented by aspects of the wireless communications systems 100 or 300, or the network architecture 200. For example, PHY signaling according to physical layer signaling separation 700 may be implemented by network entity 105 (e.g., an RU) and one or more UEs 115, which may be examples of corresponding devices described with reference to FIGS. 1-3.

As discussed herein, in some cases multiple operators may coordinate with each other (e.g., to indicate resources over which different operators may use a shared carrier). The operators may coordinate via the shared RU, or via a neutral entity (e.g., another network entity 105, or any other network node), which may act as a moderator for the coordinating operators. In some examples, the operators may communicate via backhaul signaling, such as CU to CU communication, RU to RU communication, DU to DU communication (e.g., as described in greater detail with reference to FIG. 2), or any combination thereof. In some examples, the operators may perform dynamic or semi-static coordination.

In the example of FIG. 7, a partial separation of PHY signaling messages may be sent to and from the RU for each operator, with shared signaling 760 that provides common PHY signaling for SSB 710, RMSI 715, and initial RACH messages (e.g., RACH MSG1 720, MSG2 725, and MSG3 730). In some aspects, a portion of a series of access messages may use shared signaling for multiple operators, whereas other messages of the series of access messages may be split for different operators. In some aspects, the PHY signaling may be split subsequent to MSG3 730, with the first operator 705 providing separate PHY signaling that includes MSG4 735-*a*, and unicast uplink/downlink messages 740-*a*. Likewise, in this example, the second operator 750 may provide PHY signaling that includes MSG4 735-*b*, and unicast uplink/downlink messages 740-*b*. In this example, RMSI 715 may carry information indicating the two operators, such as multiple public land mobile network (PLMN) IDs in a list of PLNM IDs, and MSG3 730 may carry information on which PLMN ID to choose to access. After MSG3 730 reception, the RU may forward the information provided in MSG3 730 to the operator associated with the indicated PLMN ID for further processing to provide MSG4 735 for the associated operator. Subsequent unicast uplink/downlink messages 740 may be communicated separately for the first operator 705 and the second operator 750.

Figure 8:
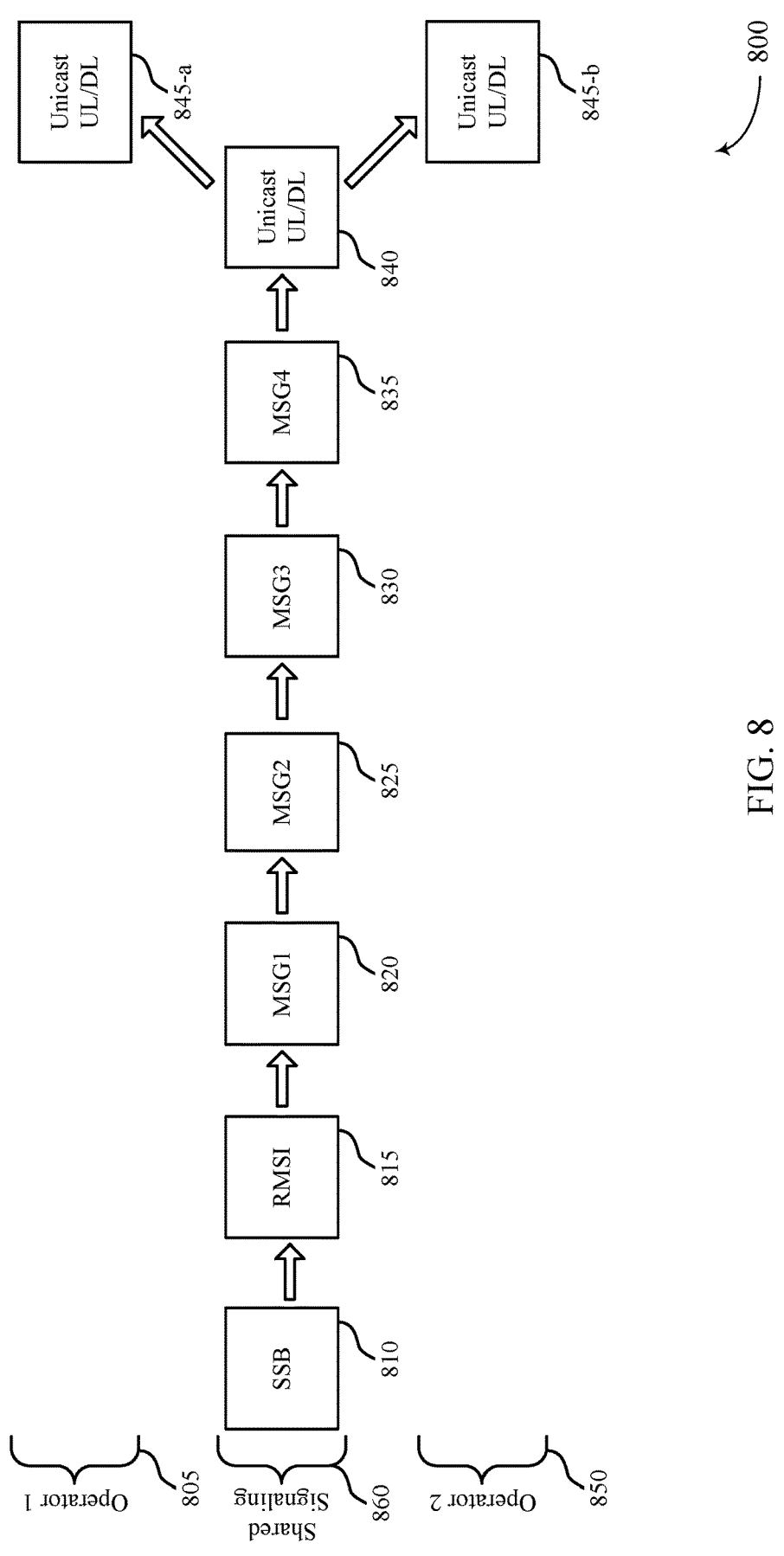

FIG. 8 illustrates another example of a physical layer signaling separation 800 that supports dynamic carrier sharing techniques for RU sharing in accordance with one or more aspects of the present disclosure. The physical layer signaling separation 800 may be implemented by aspects of the wireless communications systems 100 or 300, or the network architecture 200. For example, PHY signaling according to physical layer signaling separation 800 may be implemented by network entity 105 (e.g., an RU) and one or more UEs 115, which may be examples of corresponding devices described with reference to FIGS. 1-3.

As discussed herein, in some cases multiple operators may coordinate with each other (e.g., to indicate resources over which different operators may use a shared carrier). The operators may coordinate via the shared RU, or via a neutral entity (e.g., another network entity 105, or any other network node), which may act as a moderator for the coordinating operators. In some examples, the operators may communicate via backhaul signaling, such as CU to CU communication, RU to RU communication, DU to DU communication (e.g., as described in greater detail with reference to FIG. 2), or any combination thereof. In some examples, the operators may perform dynamic or semi-static coordination.

In the example of FIG. 8, a partial separation of PHY signaling messages may be sent to and from the RU for each operator, with shared signaling 860 that provides common PHY signaling for SSB 810, RMSI 815, RACH messages (e.g., RACH MSG1 820, MSG2 825, MSG3 830, and MSG4 835). Further, common PHY signaling may include one or more initial unicast uplink/downlink messages 840 that provides PLMN information.

The PHY signaling then may be split the first operator 805 providing separate PHY signaling for subsequent unicast uplink/downlink messages 845-a, and the second operator 850 providing separate PHY signaling for subsequent unicast uplink/downlink messages 845-b. In such examples, the RMSI 815 may optionally carry multiple PLMN IDs (e.g., in a list of PLMN IDs), and in cases where the RMSI 815 does carry a PLMN ID list, it may aid in a determination at UEs of whether to access the RU (e.g., if a UE cannot access any of the indicated PLMNs, the UE may refrain from initiating access through a RACH procedure at the RU). In cases where the UE does initiate access at the RU, after MSG4 835, the initial unicast uplink/downlink messages 840 may provide a signaling exchange between RU and UE to indicate the PLMNs of operators at the RU, and the UE may select which operator to use for communications. In some cases, this signaling may be RRC signaling or other types of signaling. While the various examples discussed herein may provide carrier sharing for a primary cell (PCell), secondary cell (SCell) carrier sharing also may be implemented using the various techniques discussed herein.

Figure 9:
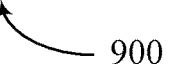
FIG. 9 illustrates an example of a process flow that supports dynamic carrier sharing techniques for RU sharing in accordance with one or more aspects of the present disclosure.

FIG. 9 illustrates an example of a process flow 900 that supports dynamic carrier sharing techniques for RU sharing in accordance with one or more aspects of the present disclosure. The process flow 900 may include a UE 115-d and a network entity 105-b, which may be examples of a UE 115 and a network entity 105 (e.g., an RU), as described herein. In the following description of the process flow 900 between the UE 115-d and the network entity 105-b, the operations may be transmitted in a different order than the example order shown, or the operations performed by the UE 115-d and the network entity 105-b may be performed in different orders or at different times. Moreover, although the following discussions describe a UE 115 and a network entity 105 (e.g., RU), the techniques described herein may be additionally or alternatively performed between UEs 115. Additionally, some operations may also be omitted from the process flow 900, and other operations may be added to the process flow 900.

As described herein, the two or more operators may share the network entity 105-b, and wireless resources of a carrier (or resources within each carrier of multiple carriers) provided by the network entity 105-b may be shared between the two or more operators. At block 905, the network entity 105-b may determine carrier sharing resources and parameters. In some cases, the carrier sharing resources and parameters may be provided by an operator of the network entity 105-b, which may be a same operator as one of the two or more operators that may share wireless resources of the carrier, or may be a different operator. In some cases, the carrier sharing resources and parameters may be provided by a DU, CU, or other network entity of one or the two or more operators.

At 910, the network entity 105-b may transmit signaling with carrier and PHY characteristics to the UE 115-d. In some cases, the signaling may be provided in a SSB, RMSI, or any combinations thereof. In some cases, the signaling may be provided in a SSB and RMSI that is common across two or more operators that share the network entity 105-b. In some cases, the signaling may be provided in a SSB and RMSI that is transmitted separately (e.g., in separate PHY transmissions) for different operators of the two or more operators that share the network entity 105-b.

At 915, the UE 1151-d may determine system information and RACH parameters. In some cases, the system information and RACH parameters may be determined based on the received SSB and RMSI transmissions. In some cases, the RACH parameters may common RACH parameters across the two or more operators that share the network entity 105-b. In some cases, the RACH parameters may be separate parameters (e.g., that indicate RACH occasions in different BWPs) associated with each operator of the two or more operators that share the network entity 105-b.

At 920, the UE 1151-d and the network entity 105-b may perform a RACH access procedure. In some cases, the UE 1151-d and network entity 105-b may exchange RACH MSG1 through MSG3 using common resources across the different operators, and may exchange a MSG4 transmission using separate resources for the different operators. In some cases, the UE 1151-d and network entity 105-b may exchange RACH MSG1 through MSG4 using common resources across the different operators, and one or more initial unicast communications may provide PLMN information that may be used to indicate separate PHY signaling for subsequent unicast communications in which the different operators share orthogonal resources. In some further cases, the UE 115-d and network entity 105-b may exchange RACH messages using different resources for the different operators.

At 925, the network entity 105-b may transmit, and the UE 115-d may receive, scheduling information for one or more subsequent unicast transmissions associated with one of the two or more different operators that share the network entity 105-b. At 930, the UE 1151-d and the network entity 105-b may exchange unicast communications based on the scheduling information. In some cases, the unicast communications of the different operators that share the network entity 105-b may use orthogonal resources within a shared carrier of the network entity 105-b.

Figure 10:
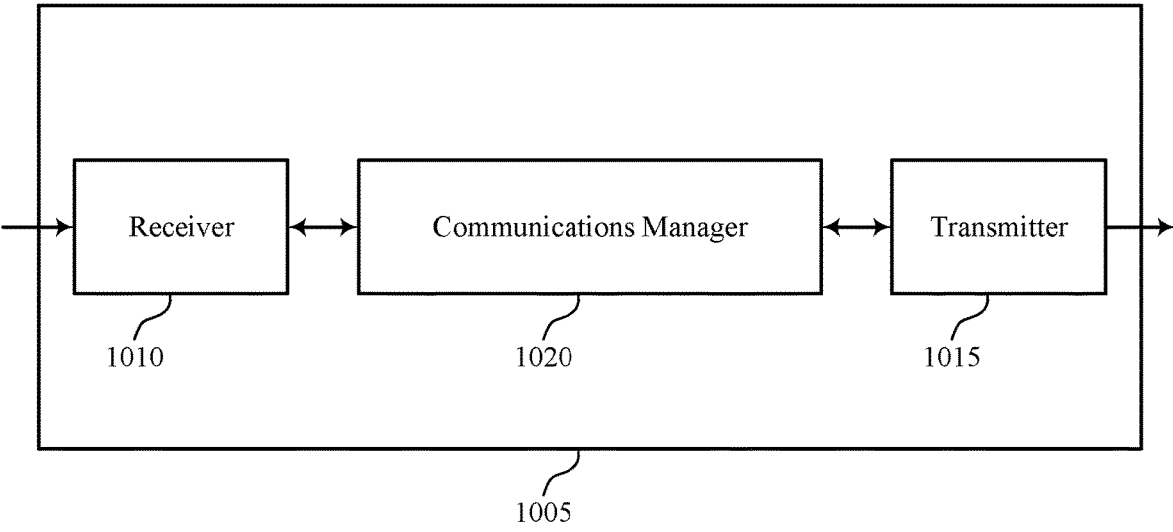
FIGS. 10 and 11 show block diagrams of devices that support dynamic carrier sharing techniques for RU sharing in accordance with one or more aspects of the present disclosure.

FIG. 10 shows a block diagram 1000 of a device 1005 that supports dynamic carrier sharing techniques for RU sharing in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of dynamic carrier sharing techniques for RU sharing as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting)

using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 may be configured as or otherwise support a means for transmitting, to a UE via an RU, one or more downlink messages using a carrier that supports signaling for two or more operators, where the one or more downlink messages are transmitted based on a separation of physical layer signaling for the two or more operators. The communications manager 1020 may be configured as or otherwise support a means for communicating, via the RU, with the UE using the carrier, where one or more unicast messages are communicated using a first set of resources associated with a first operator of the two or more operators or using a second set of resources associated with a second operator of the two or more operators, the second set of resources being different from the first set of resources.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for carrier sharing at an RU that provides for efficient utilization of an RU shared by multiple different operators, and may provide for lower cost deployments, enhanced efficiency across operators, enhanced data throughput, reduced power consumption, and enhanced user experiences.

Figure 11:
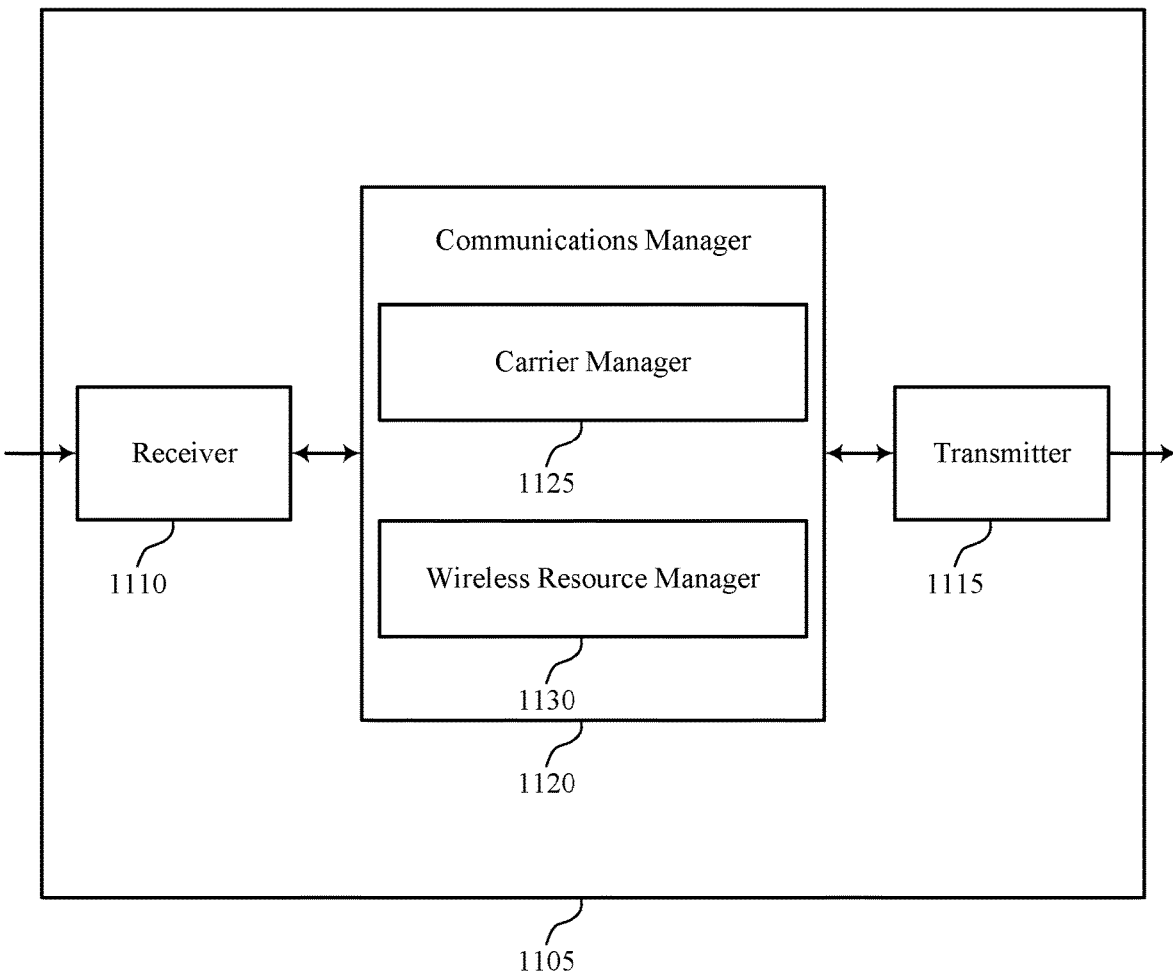

FIG. 11 shows a block diagram 1100 of a device 1105 that supports dynamic carrier sharing techniques for RU sharing in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of dynamic carrier sharing techniques for RU sharing as described herein. For example, the communications manager 1120 may include a carrier manager 1125 a wireless resource manager 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The carrier manager 1125 may be configured as or otherwise support a means for transmitting, to a UE via an RU, one or more downlink messages using a carrier that supports signaling for two or more operators, where the one or more downlink messages are transmitted based on a separation of physical layer signaling for the two or more operators. The wireless resource manager 1130 may be configured as or otherwise support a means for communicating, via the RU, with the UE using the carrier, where one or more unicast messages are communicated using a first set of resources associated with a first operator of the two or more operators or using a second set of resources associated with a second operator of the two or more operators, the second set of resources being different from the first set of resources.

Figure 12:
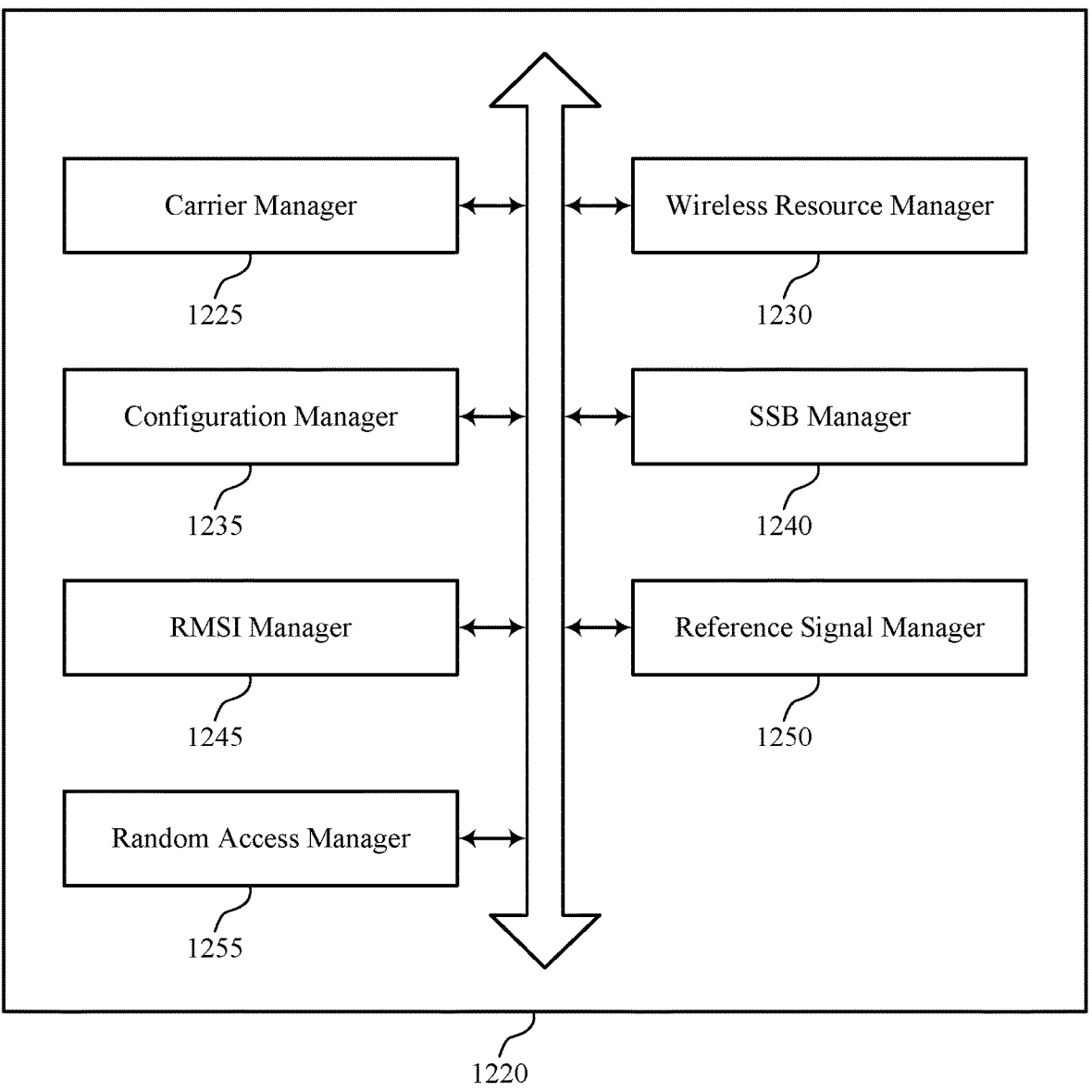
FIG. 12 shows a block diagram of a communications manager that supports dynamic carrier sharing techniques for RU sharing in accordance with one or more aspects of the present disclosure.

FIG. 12 shows a block diagram 1200 of a communications manager 1220 that supports dynamic carrier sharing techniques for RU sharing in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of dynamic carrier sharing techniques for RU sharing as described herein. For example, the communications manager 1220 may include a carrier manager 1225, a wireless resource manager 1230, a configuration manager 1235, an SSB manager 1240, an RMSI manager 1245, a reference signal manager 1250, a random access manager 1255, or any combination thereof. Each of these components may communicate, directly or indirectly, with one another (e.g., via one or more buses), which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications in accordance with examples as disclosed herein. The carrier manager 1225 may be configured as or otherwise support a means for transmitting, to a UE via an RU, one or more downlink messages using a carrier that supports signaling for two or more operators, where the one or more downlink messages are transmitted based on a separation of physical layer signaling for the two or more operators. The wireless resource manager 1230 may be configured as or otherwise support a means for communicating, via the RU, with the UE using the carrier, where one or more unicast messages are communicated using a first set of resources associated with a first operator of the two or more operators or using a second set of resources associated with a second operator of the two or more operators, the second set of resources being different from the first set of resources.

In some examples, the configuration manager 1235 may be configured as or otherwise support a means for receiving, by a first network entity associated with the RU, one or more control messages indicating a configuration for separating resources for communicating with the UE using the carrier, where communicating with the UE is based on the configuration.

In some examples, to support transmitting the one or more downlink messages, the SSB manager 1240 may be configured as or otherwise support a means for transmitting a first set of synchronization signal blocks associated with the first operator in accordance with a first synchronization raster of the carrier. In some examples, to support transmitting the one or more downlink messages, the SSB manager 1240 may be configured as or otherwise support a means for transmitting a second set of synchronization signal blocks associated with the second operator in accordance with a second synchronization raster that is different than the first synchronization raster of the carrier, the first set of synchronization signal blocks indicating a first initial bandwidth part of the carrier and the second set of synchronization signal blocks indicating a second initial bandwidth part of the carrier different from the first initial bandwidth part.

In some examples, the RMSI manager 1245 may be configured as or otherwise support a means for transmitting, via the carrier, one or more first system information messages associated with the first operator and using a first set of resources. In some examples, the RMSI manager 1245 may be configured as or otherwise support a means for transmitting, via the carrier, one or more second system information messages associated with the second operator and using a second set of resources different from the first set of resources, where communicating with the UE using the carrier is based on transmitting the one or more first system information messages and the one or more second system information messages. In some examples, the one or more first system information messages and the one or more second system information messages each indicate a same time-division duplexing resource pattern, a same synchronization signal position, or both.

In some examples, the random access manager 1255 may be configured as or otherwise support a means for performing, via the carrier, an access operation with the UE using a first set of random access resources associated with the first operator or a second set of random access resources associated with the second operator, the access operation including a series of random access messages between the RU and the UE via the first set of random access resources or the second set of random access resources, where the first set of random access resources are different from the second set of random access resources in the carrier.

In some examples, the wireless resource manager 1230 may be configured as or otherwise support a means for transmitting, to the UE, a control message indicating that the carrier is configured as an uplink bandwidth part or a downlink bandwidth part, where communicating with the UE using the carrier is based on the control message.

In some examples, to support transmitting the one or more downlink messages, the SSB manager 1240 may be configured as or otherwise support a means for transmitting, via the carrier, a shared set of synchronization signal blocks associated with the first operator and the second operator. In some examples, to support transmitting the one or more downlink messages, the RMSI manager 1245 may be configured as or otherwise support a means for transmitting, via the carrier, one or more shared system information messages associated the first operator and the second operator, where communicating with the UE is based on the shared set of synchronization signal blocks and the one or more shared system information messages. In some examples, the one or more shared system information messages include first information that is common to the first operator and the second operator and second information that is different for the first operator and the second operator.

In some examples, the random access manager 1255 may be configured as or otherwise support a means for performing, via the carrier, an access operation with the UE based on a first random access configuration associated with the first operator or a second random access configuration associated with the second operator, the first random access configuration and the second random access configuration being indicated by a system information message of the one or more shared system information messages, where the access operation includes a series of access messages transmitted between the RU and the UE via a first set of random access resources associated with the first random access configuration or via a second set of random access resources associated with the second random access configuration, and where the first set of random access resources is different from the second set of random access resources.

In some examples, the random access manager 1255 may be configured as or otherwise support a means for performing, via the carrier, an access operation with the UE based on one or more shared random access resources of the carrier, where the access operation includes a series of random access messages transmitted between the RU and the UE via the one or more shared random access resources. In some examples, the random access manager 1255 may be configured as or otherwise support a means for transmitting, via the carrier, a downlink random access message to the UE using a first random access resource associated with the first operator or a second random access resource associated with the second operator, the downlink random access message being transmitted in response to an uplink random access message of the series of random access messages, where the first random access resource is different from the second random access resource. In some examples, the uplink random access message indicates a first PLMN identifier selected from a list of PLMN identifiers associated with the first operator and the second operator, where a system information message of the one or more shared system information messages indicates the list of PLMN identifiers. In some examples, the random access manager 1255 may be configured as or otherwise support a means for forwarding the uplink random access message to a first network entity associated with the first operator or to a second network entity associated with the second operator based on the PLMN identifier, where transmitting the downlink random access message is based on forwarding the uplink random access message.

In some examples, the random access manager 1255 may be configured as or otherwise support a means for performing, via the carrier, an access operation with the UE based on one or more shared random access resources of the carrier, where the access operation includes a series of random access messages transmitted between the RU and the UE via the one or more shared random access resources. In some examples, the wireless resource manager 1230 may be configured as or otherwise support a means for transmitting, via the carrier, a first unicast message to the UE via a set of resources shared by the first operator and the second operator, the first unicast message including an indication of a list of PLMN identifiers associated with the first operator and the second operator. In some examples, the wireless resource manager 1230 may be configured as or otherwise support a means for receiving, via the carrier, a second unicast message from the UE via the set of resources, the second unicast message indicating a PLMN identifier from a list of PLMN identifiers, where communicating with the UE is based on the PLMN identifier. In some examples, a system information message of the one or more shared system information messages includes a list of PLMN identifiers.

In some examples, the reference signal manager 1250 may be configured as or otherwise support a means for transmitting, via the carrier, one or more channel state information reference signals, where the one or more channel state information reference signals are associated with the first operator and the second operator. In some examples, the reference signal manager 1250 may be configured as or otherwise support a means for receiving one or more sounding reference signals from the UE via the carrier. In some examples, the reference signal manager 1250 may be configured as or otherwise support a means for forwarding the one or more sounding reference signals to a first network entity associated with the first operator or to a second network entity associated with the second operator. In some examples, the RU operates in one or more unlicensed radio frequency spectrum bands, one or more radio frequency spectrum bands that are shared by the first operator and the second operator, one or more licensed radio frequency spectrum bands, or any combination thereof.

Figure 13:
FIG. 13 shows a diagram of a system including a device that supports dynamic carrier sharing techniques for RU sharing in accordance with one or more aspects of the present disclosure.

FIG. 13 shows a diagram of a system 1300 including a device 1305 that supports dynamic carrier sharing techniques for RU sharing in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting dynamic carrier sharing techniques for RU sharing). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications in accordance with examples as disclosed herein. For example, the communications manager 1320 may be configured as or otherwise support a means for transmitting, to a UE via an RU, one or more downlink messages using a carrier that supports signaling for two or more operators, where the one or more downlink messages are transmitted based on a separation of physical layer signaling for the two or more operators. The communications manager 1320 may be configured as or otherwise support a means for communicating, via the RU, with the UE using the carrier, where one or more unicast messages are communicated using a first set of resources associated with a first operator of the two or more operators or using a second set of resources associated with a second operator of the two or more operators, the second set of resources being different from the first set of resources.

By including or configuring the communications manager 1320 in accordance with examples as described herein, the device 1305 may support techniques for carrier sharing at an RU that provides for efficient utilization of an RU shared by multiple different operators, and may provide for lower cost deployments, enhanced efficiency across operators, enhanced data throughput, reduced power consumption, and enhanced user experiences.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of dynamic carrier sharing techniques for RU sharing as described herein, or the processor 1335 and the memory 1325 may be otherwise configured to perform or support such operations.

Figure 14:
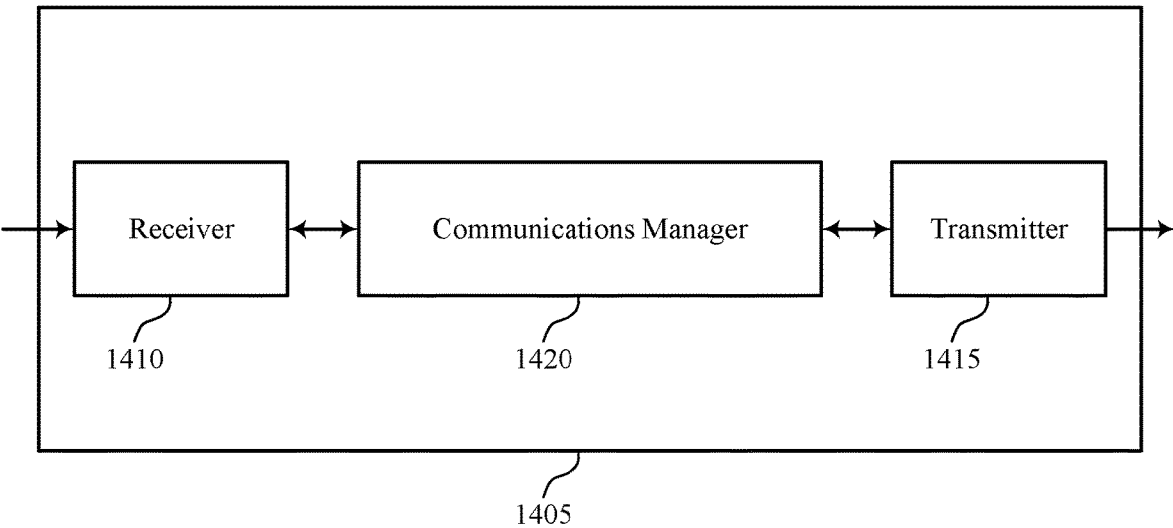
FIGS. 14 and 15 show block diagrams of devices that support dynamic carrier sharing techniques for RU sharing in accordance with one or more aspects of the present disclosure.

FIG. 14 shows a block diagram 1400 of a device 1405 that supports dynamic carrier sharing techniques for RU sharing in accordance with one or more aspects of the present disclosure. The device 1405 may be an example of aspects of a UE 115 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to dynamic carrier sharing techniques for RU sharing). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to dynamic carrier sharing techniques for RU sharing). In some examples, the transmitter 1415 may be co-located with a receiver 1410 in a transceiver module. The transmitter 1415 may utilize a single antenna or a set of multiple antennas.

The communications manager 1420, the receiver 1410, the transmitter 1415, or various combinations thereof or various components thereof may be examples of means for performing various aspects of dynamic carrier sharing techniques for RU sharing as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1420 may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications at a UE in accordance with examples as disclosed herein. For example, the communications manager 1420 may be configured as or otherwise support a means for receiving, from an RU, one or more downlink messages via a carrier that supports signaling for two or more operators. The communications manager 1420 may be configured as or otherwise support a means for communicating with the RU using the carrier and based on the one or more downlink messages, where one or more unicast messages are communicated using a first set of resources associated with a first operator of the two or more operators or using a second set of resources associated with a second operator of the two or more operators, the second set of resources being different from the first set of resources.

By including or configuring the communications manager 1420 in accordance with examples as described herein, the device 1405 (e.g., a processor controlling or otherwise coupled with the receiver 1410, the transmitter 1415, the communications manager 1420, or a combination thereof) may support techniques for carrier sharing at an RU that provides for efficient utilization of an RU shared by multiple different operators, and may provide for lower cost deployments, enhanced efficiency across operators, enhanced data throughput, reduced power consumption, and enhanced user experiences.

Figure 15:
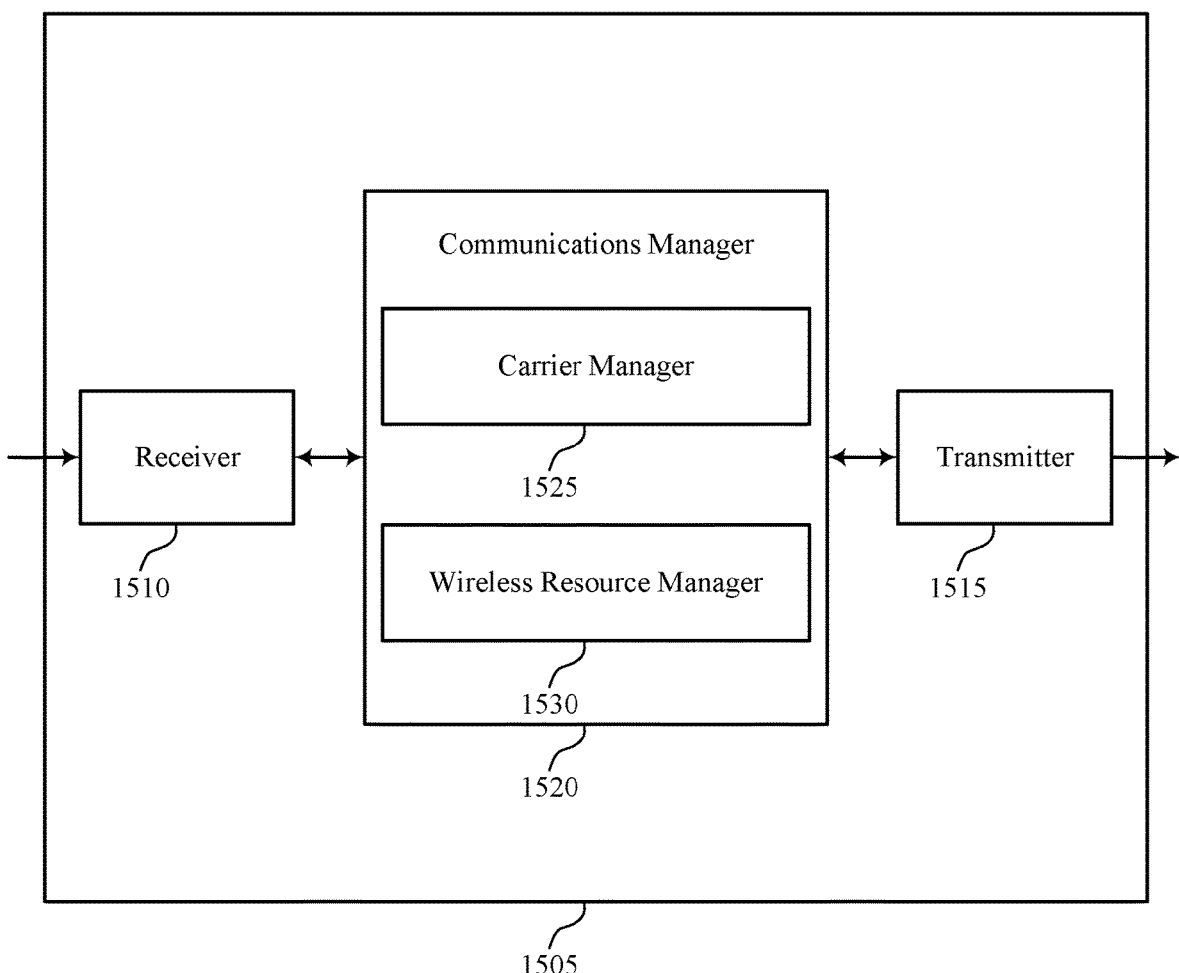

FIG. 15 shows a block diagram 1500 of a device 1505 that supports dynamic carrier sharing techniques for RU sharing in accordance with one or more aspects of the present disclosure. The device 1505 may be an example of aspects of a device 1405 or a UE 115 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to dynamic carrier sharing techniques for RU sharing). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to dynamic carrier sharing techniques for RU sharing). In some examples, the transmitter 1515 may be co-located with a receiver 1510 in a transceiver module. The transmitter 1515 may utilize a single antenna or a set of multiple antennas.

The device 1505, or various components thereof, may be an example of means for performing various aspects of dynamic carrier sharing techniques for RU sharing as described herein. For example, the communications manager 1520 may include a carrier manager 1525 a wireless resource manager 1530, or any combination thereof. The communications manager 1520 may be an example of aspects of a communications manager 1420 as described herein. In some examples, the communications manager 1520, or various components thereof, may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations as described herein.

The communications manager 1520 may support wireless communications at a UE in accordance with examples as disclosed herein. The carrier manager 1525 may be configured as or otherwise support a means for receiving, from an RU, one or more downlink messages via a carrier that supports signaling for two or more operators. The wireless resource manager 1530 may be configured as or otherwise support a means for communicating with the RU using the carrier and based on the one or more downlink messages, where one or more unicast messages are communicated using a first set of resources associated with a first operator of the two or more operators or using a second set of resources associated with a second operator of the two or more operators, the second set of resources being different from the first set of resources.

Figure 16:
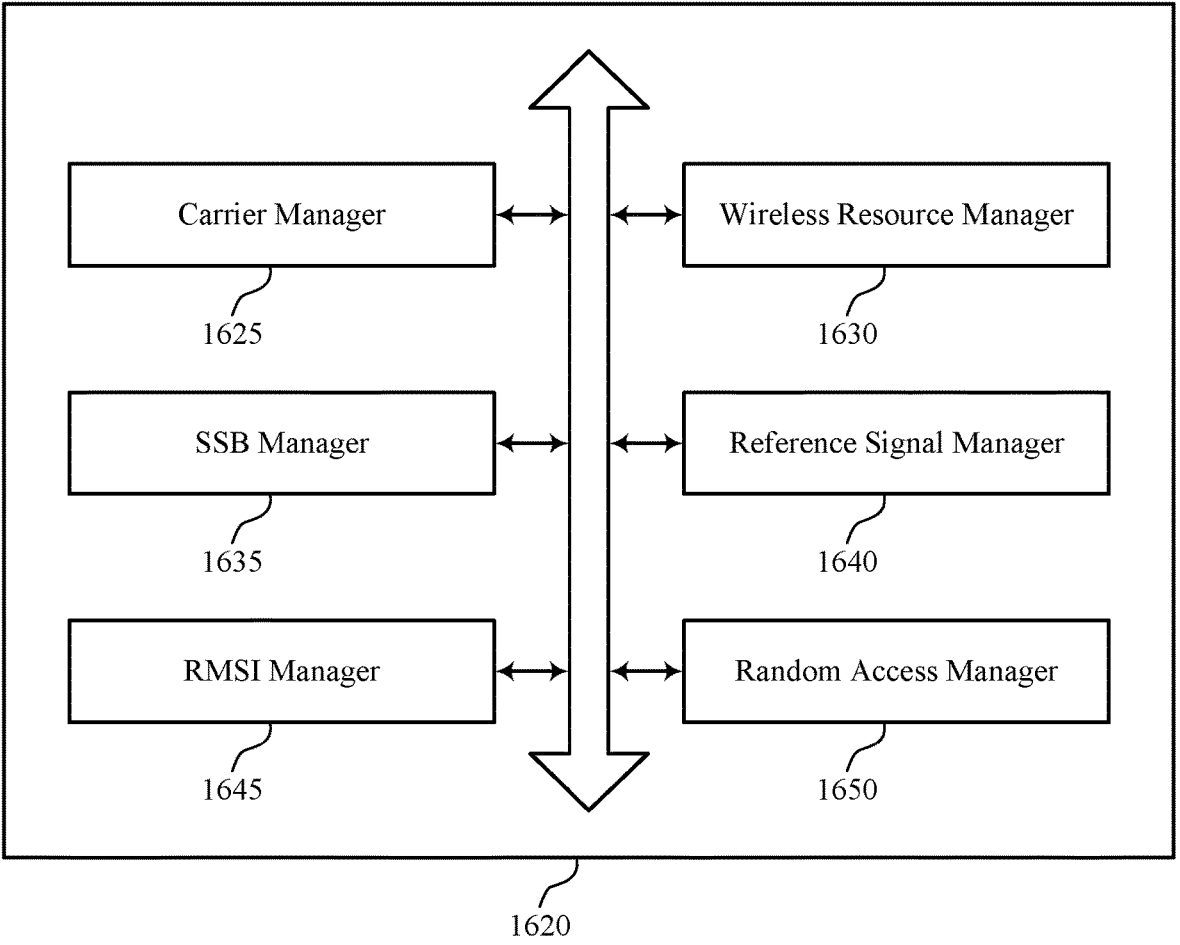
FIG. 16 shows a block diagram of a communications manager that supports dynamic carrier sharing techniques for RU sharing in accordance with one or more aspects of the present disclosure.

FIG. 16 shows a block diagram 1600 of a communications manager 1620 that supports dynamic carrier sharing techniques for RU sharing in accordance with one or more aspects of the present disclosure. The communications manager 1620 may be an example of aspects of a communications manager 1420, a communications manager 1520, or both, as described herein. The communications manager 1620, or various components thereof, may be an example of means for performing various aspects of dynamic carrier sharing techniques for RU sharing as described herein. For example, the communications manager 1620 may include a carrier manager 1625, a wireless resource manager 1630, an SSB manager 1635, a reference signal manager 1640, an RMSI manager 1645, a random access manager 1650, or any combination thereof. Each of these components may communicate, directly or indirectly, with one another (e.g., via one or more buses).

The communications manager 1620 may support wireless communications at a UE in accordance with examples as disclosed herein. The carrier manager 1625 may be configured as or otherwise support a means for receiving, from an RU, one or more downlink messages via a carrier that supports signaling for two or more operators. The wireless resource manager 1630 may be configured as or otherwise support a means for communicating with the RU using the carrier and based on the one or more downlink messages, where one or more unicast messages are communicated using a first set of resources associated with a first operator of the two or more operators or using a second set of resources associated with a second operator of the two or more operators, the second set of resources being different from the first set of resources.

In some examples, to support receiving the one or more downlink messages, the SSB manager 1635 may be configured as or otherwise support a means for receiving, via the carrier, a shared set of synchronization signal blocks associated with the first operator and the second operator. In some examples, to support receiving the one or more downlink messages, the SSB manager 1635 may be configured as or otherwise support a means for receiving, via the carrier, one or more shared system information messages associated the first operator and the second operator, where communicating with the RU is based on the shared set of synchronization signal blocks and the one or more shared system information messages.

In some examples, the one or more shared system information messages include first information that is common to the first operator and the second operator and second information that is different for the first operator and the second operator.

In some examples, a system information message of the one or more shared system information messages includes a first random access configuration associated with the first operator and a second random access configuration associated with the second operator, and the random access manager 1650 may be configured as or otherwise support a means for performing, via the carrier, an access operation with the RU in accordance with the first random access configuration or the second random access configuration, where the access operation includes a series of random access messages transmitted between the RU and the UE via a first set of random access resources associated with the first random access configuration or via a second set of random access resources associated with the second random access configuration, and where the first set of random access resources is different from the second set of random access resources.

In some examples, the random access manager 1650 may be configured as or otherwise support a means for performing, via the carrier, an access operation with the RU based on one or more shared random access resources of the carrier, where the access operation includes a series of random access messages transmitted between the RU and the UE via the one or more shared random access resources. In some examples, the random access manager 1650 may be configured as or otherwise support a means for receiving, via the carrier, a downlink random access message using a first random access resource associated with the first operator or a second random access resource associated with the second operator, the downlink random access message being transmitted in response to an uplink random access message of the series of random access messages, where the first random access resource is different from the second random access resource. In some examples, the uplink random access message indicates a first PLMN identifier selected from a list of PLMN identifiers associated with the first operator and the second operator, where a system information message of the one or more shared system information messages indicates the list of PLMN identifiers.

In some examples, the random access manager 1650 may be configured as or otherwise support a means for performing, via the carrier, an access operation with the RU based on one or more shared random access resources of the carrier, where the access operation includes a series of random access messages transmitted between the RU and the UE via the one or more shared random access resources. In some examples, the wireless resource manager 1630 may be configured as or otherwise support a means for receiving, via the carrier, a first unicast message from the RU via a set of resources shared by the first operator and the second operator, the first unicast message including an indication of a list of PLMN identifiers associated with the first operator and the second operator. In some examples, the wireless resource manager 1630 may be configured as or otherwise support a means for transmitting, via the carrier, a second unicast message to the RU via the set of resources, the second unicast message indicating a PLMN identifier from a list of PLMN identifiers, where communicating with the RU is based on the PLMN identifier.

In some examples, a system information message of the one or more shared system information messages includes a list of PLMN identifiers, and the random access manager 1650 may be configured as or otherwise support a means for refraining from performing an access operation with the RU based on the list of PLMN identifiers.

In some examples, the reference signal manager 1640 may be configured as or otherwise support a means for receiving, via the carrier, one or more channel state information reference signals, where the one or more channel state information reference signals are associated with the first operator and the second operator. In some examples, the wireless resource manager 1630 may be configured as or otherwise support a means for receiving, from the RU, a control message indicating that the carrier is configured as an uplink bandwidth part or a downlink bandwidth part, where communicating with the UE using the carrier is based on the control message.

Figure 17:
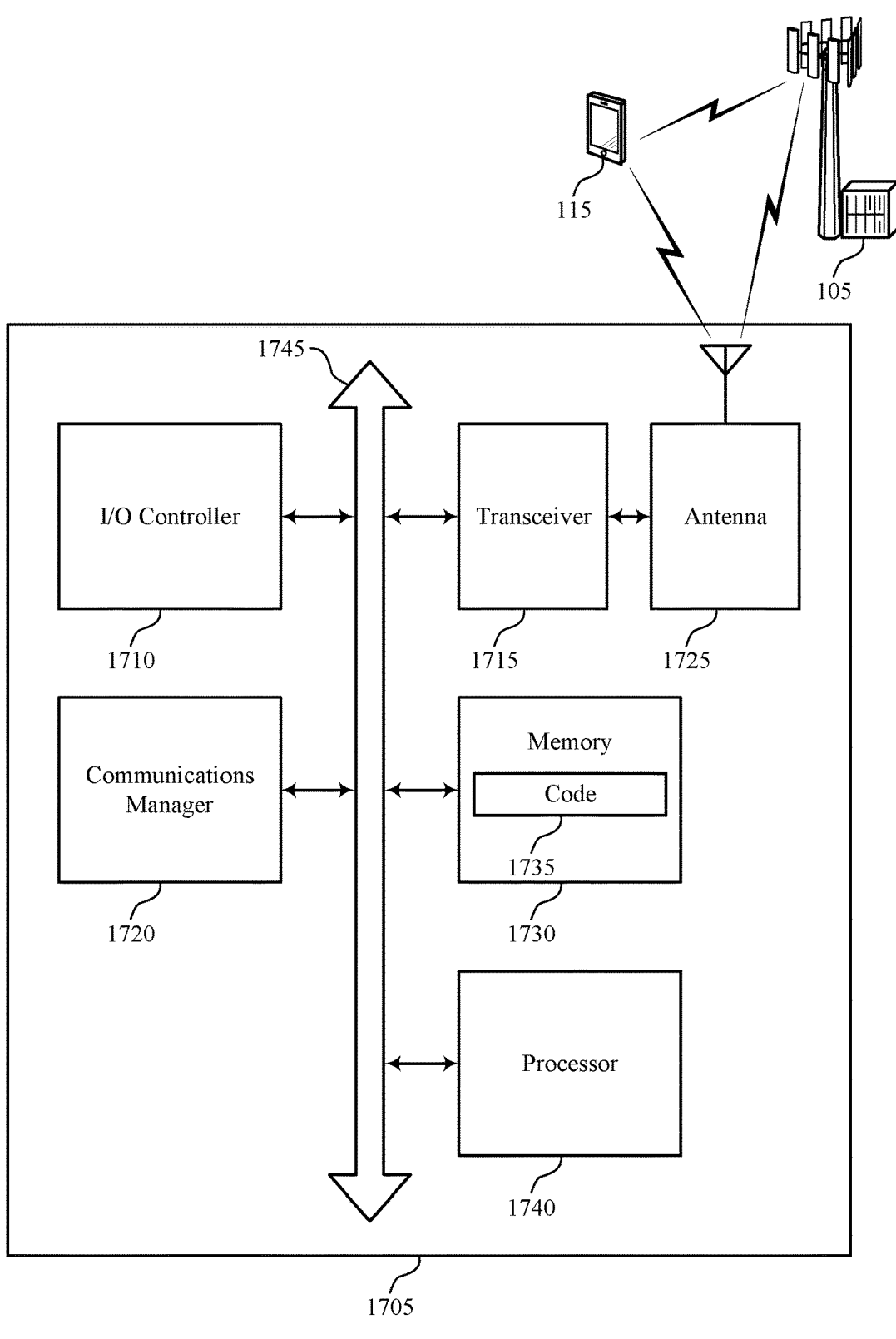
FIG. 17 shows a diagram of a system including a device that supports dynamic carrier sharing techniques for RU sharing in accordance with one or more aspects of the present disclosure.

FIG. 17 shows a diagram of a system 1700 including a device 1705 that supports dynamic carrier sharing techniques for RU sharing in accordance with one or more aspects of the present disclosure. The device 1705 may be an example of or include the components of a device 1405, a device 1505, or a UE 115 as described herein. The device 1705 may communicate (e.g., wirelessly) with one or more network entities 105, one or more UEs 115, or any combination thereof. The device 1705 may include components for bi-directional voice and data communications including components for transmitting and receiving communications, such as a communications manager 1720, an input/output (I/O) controller 1710, a transceiver 1715, an antenna 1725, a memory 1730, code 1735, and a processor 1740. These components may be in electronic communication or otherwise coupled (e.g., operatively, communicatively, functionally, electronically, electrically) via one or more buses (e.g., a bus 1745).

The I/O controller 1710 may manage input and output signals for the device 1705. The I/O controller 1710 may also manage peripherals not integrated into the device 1705. In some cases, the I/O controller 1710 may represent a physical connection or port to an external peripheral. In some cases, the I/O controller 1710 may utilize an operating system such as iOS®, ANDROID®, MS-DOS®, MS-WINDOWS®, OS/2®, UNIX®, LINUX®, or another known operating system. Additionally, or alternatively, the I/O controller 1710 may represent or interact with a modem, a keyboard, a mouse, a touchscreen, or a similar device. In some cases, the I/O controller 1710 may be implemented as part of a processor, such as the processor 1740. In some cases, a user may interact with the device 1705 via the I/O controller 1710 or via hardware components controlled by the I/O controller 1710.

In some cases, the device 1705 may include a single antenna 1725. However, in some other cases, the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or any combination thereof or component thereof, as described herein.

The memory 1730 may include random access memory (RAM) and read-only memory (ROM). The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a basic I/O system (BIOS), which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting dynamic carrier sharing techniques for RU sharing). For example, the device 1705 or a component of the device 1705 may include a processor 1740 and memory 1730 coupled with or to the processor 1740, the processor 1740 and memory 1730 configured to perform various functions described herein.

The communications manager 1720 may support wireless communications at a UE in accordance with examples as disclosed herein. For example, the communications manager 1720 may be configured as or otherwise support a means for receiving, from an RU, one or more downlink messages via a carrier that supports signaling for two or more operators. The communications manager 1720 may be configured as or otherwise support a means for communicating with the RU using the carrier and based on the one or more downlink messages, where one or more unicast messages are communicated using a first set of resources associated with a first operator of the two or more operators or using a second set of resources associated with a second operator of the two or more operators, the second set of resources being different from the first set of resources.

By including or configuring the communications manager 1720 in accordance with examples as described herein, the device 1705 may support techniques for carrier sharing at an RU that provides for efficient utilization of an RU shared by multiple different operators, and may provide for lower cost deployments, enhanced efficiency across operators, enhanced data throughput, reduced power consumption, and enhanced user experiences.

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of dynamic carrier sharing techniques for RU sharing as described herein, or the processor 1740 and the memory 1730 may be otherwise configured to perform or support such operations.

FIG. 18 shows a flowchart illustrating a method 1800 that supports dynamic carrier sharing techniques for RU sharing in accordance with one or more aspects of the present disclosure. The operations of the method 1800 may be implemented by a network entity or its components as described herein. For example, the operations of the method 1800 may be performed by a network entity as described with reference to FIGS. 1 through 13. In some examples, a network entity may execute a set of instructions to control the functional elements of the network entity to perform the described functions. Additionally, or alternatively, the network entity may perform aspects of the described functions using special-purpose hardware.

At 1805, the method may include receiving, by a first network entity associated with the RU, one or more control messages indicating a configuration for separating resources for communicating with the UE using the carrier, where communicating with the UE is based on the configuration. The operations of 1805 may be performed in accordance with examples as disclosed herein. In some examples, aspects of the operations of 1805 may be performed by a configuration manager 1235 as described with reference to FIG. 12.

At 1810, the method may include transmitting, to a UE via an RU, one or more downlink messages using a carrier that supports signaling for two or more operators, where the one or more downlink messages are transmitted based on a separation of physical layer signaling for the two or more operators. The operations of 1810 may be performed in accordance with examples as disclosed herein. In some examples, aspects of the operations of 1810 may be performed by a carrier manager 1225 as described with reference to FIG. 12.

At 1815, the method may include communicating, via the RU, with the UE using the carrier, where one or more unicast messages are communicated using a first set of resources associated with a first operator of the two or more operators or using a second set of resources associated with a second operator of the two or more operators, the second set of resources being different from the first set of resources. The operations of 1815 may be performed in accordance with examples as disclosed herein. In some examples, aspects of the operations of 1815 may be performed by a wireless resource manager 1230 as described with reference to FIG. 12.

Figure 19:
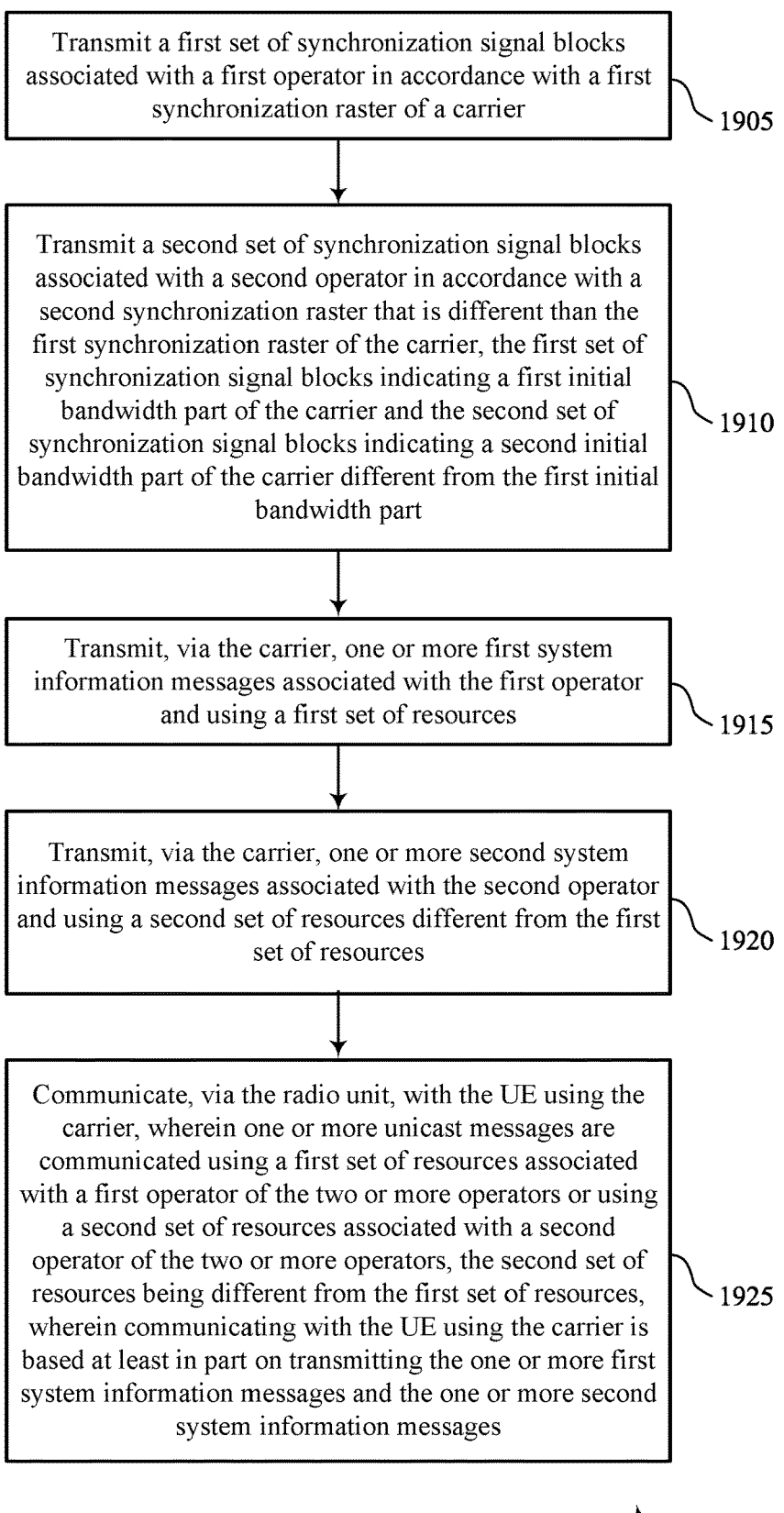

FIG. 19 shows a flowchart illustrating a method 1900 that supports dynamic carrier sharing techniques for RU sharing in accordance with one or more aspects of the present disclosure. The operations of the method 1900 may be implemented by a network entity or its components as described herein. For example, the operations of the method 1900 may be performed by a network entity as described with reference to FIGS. 1 through 13. In some examples, a network entity may execute a set of instructions to control the functional elements of the network entity to perform the described functions. Additionally, or alternatively, the network entity may perform aspects of the described functions using special-purpose hardware.

At 1905, the method may include transmitting a first set of synchronization signal blocks associated with a first operator in accordance with a first synchronization raster of a carrier. The operations of 1905 may be performed in accordance with examples as disclosed herein. In some examples, aspects of the operations of 1905 may be performed by an SSB manager 1240 as described with reference to FIG. 12.

At 1910, the method may include transmitting a second set of synchronization signal blocks associated with a second operator in accordance with a second synchronization raster that is different than the first synchronization raster of the carrier, the first set of synchronization signal blocks indicating a first initial bandwidth part of the carrier and the second set of synchronization signal blocks indicating a second initial bandwidth part of the carrier different from the first initial bandwidth part. The operations of 1910 may be performed in accordance with examples as disclosed herein. In some examples, aspects of the operations of 1910 may be performed by an SSB manager 1240 as described with reference to FIG. 12.

At 1915, the method may include transmitting, via the carrier, one or more first system information messages associated with the first operator and using a first set of resources. The operations of 1915 may be performed in accordance with examples as disclosed herein. In some examples, aspects of the operations of 1915 may be performed by an RMSI manager 1245 as described with reference to FIG. 12.

At 1920, the method may include transmitting, via the carrier, one or more second system information messages associated with the second operator and using a second set of resources different from the first set of resources. The operations of 1920 may be performed in accordance with examples as disclosed herein. In some examples, aspects of the operations of 1920 may be performed by an RMSI manager 1245 as described with reference to FIG. 12.

At 1925, the method may include communicating, via the RU, with the UE using the carrier, where one or more unicast messages are communicated using a first set of resources associated with a first operator of the two or more operators or using a second set of resources associated with a second operator of the two or more operators, the second set of resources being different from the first set of resources. In some cases, communicating with the UE using the carrier is based on transmitting the one or more first system information messages and the one or more second system information messages. The operations of 1925 may be performed in accordance with examples as disclosed herein. In some examples, aspects of the operations of 1925 may be performed by a wireless resource manager 1230 as described with reference to FIG. 12.

FIG. 20 shows a flowchart illustrating a method 2000 that supports dynamic carrier sharing techniques for RU sharing in accordance with one or more aspects of the present disclosure. The operations of the method 2000 may be implemented by a network entity or its components as described herein. For example, the operations of the method 2000 may be performed by a network entity as described with reference to FIGS. 1 through 13. In some examples, a network entity may execute a set of instructions to control the functional elements of the network entity to perform the described functions. Additionally, or alternatively, the network entity may perform aspects of the described functions using special-purpose hardware.

At 2005, the method may include transmitting, via a carrier, a shared set of synchronization signal blocks associated with a first operator and a second operator. The operations of 2005 may be performed in accordance with examples as disclosed herein. In some examples, aspects of the operations of 2005 may be performed by an SSB manager 1240 as described with reference to FIG. 12.

At 2010, the method may include transmitting, via the carrier, one or more shared system information messages associated the first operator and the second operator, where communicating with a UE is based on the shared set of synchronization signal blocks and the one or more shared system information messages. The operations of 2010 may be performed in accordance with examples as disclosed herein. In some examples, aspects of the operations of 2010 may be performed by an RMSI manager 1245 as described with reference to FIG. 12.

At 2015, the method may include performing, via the carrier, an access operation with the UE based on a first random access configuration associated with the first operator or a second random access configuration associated with the second operator, the first random access configuration and the second random access configuration being indicated by a system information message of the one or more shared system information messages, where the access operation includes a series of access messages transmitted between the RU and the UE via a first set of random access resources associated with the first random access configuration or via a second set of random access resources associated with the second random access configuration, and where the first set of random access resources is different from the second set of random access resources. The operations of 2015 may be performed in accordance with examples as disclosed herein. In some examples, aspects of the operations of 2015 may be performed by a random access manager 1255 as described with reference to FIG. 12.

FIG. 21 shows a flowchart illustrating a method 2100 that supports dynamic carrier sharing techniques for RU sharing in accordance with one or more aspects of the present disclosure. The operations of the method 2100 may be implemented by a network entity or its components as described herein. For example, the operations of the method 2100 may be performed by a network entity as described with reference to FIGS. 1 through 13. In some examples, a network entity may execute a set of instructions to control the functional elements of the network entity to perform the described functions. Additionally, or alternatively, the network entity may perform aspects of the described functions using special-purpose hardware.

At 2105, the method may include transmitting, via a carrier, a shared set of synchronization signal blocks associated with a first operator and a second operator. The operations of 2105 may be performed in accordance with examples as disclosed herein. In some examples, aspects of the operations of 2105 may be performed by an SSB manager 1240 as described with reference to FIG. 12.

At 2110, the method may include transmitting, via the carrier, one or more shared system information messages associated the first operator and the second operator, where communicating with a UE is based on the shared set of synchronization signal blocks and the one or more shared system information messages. The operations of 2110 may be performed in accordance with examples as disclosed herein. In some examples, aspects of the operations of 2110 may be performed by an RMSI manager 1245 as described with reference to FIG. 12.

At 2115, the method may include performing, via the carrier, an access operation with the UE based on one or more shared random access resources of the carrier, where the access operation includes a series of random access messages transmitted between the RU and the UE via the one or more shared random access resources. The operations of 2115 may be performed in accordance with examples as disclosed herein. In some examples, aspects of the operations of 2115 may be performed by a random access manager 1255 as described with reference to FIG. 12.

At 2120, the method may include transmitting, via the carrier, a downlink random access message to the UE using a first random access resource associated with the first operator or a second random access resource associated with the second operator, the downlink random access message being transmitted in response to an uplink random access message of the series of random access messages, where the first random access resource is different from the second random access resource. The operations of 2120 may be performed in accordance with examples as disclosed herein. In some examples, aspects of the operations of 2120 may be performed by a random access manager 1255 as described with reference to FIG. 12.

FIG. 22 shows a flowchart illustrating a method 2200 that supports dynamic carrier sharing techniques for RU sharing in accordance with one or more aspects of the present disclosure. The operations of the method 2200 may be implemented by a network entity or its components as described herein. For example, the operations of the method 2200 may be performed by a network entity as described with reference to FIGS. 1 through 13. In some examples, a network entity may execute a set of instructions to control the functional elements of the network entity to perform the described functions. Additionally, or alternatively, the network entity may perform aspects of the described functions using special-purpose hardware.

At 2205, the method may include transmitting, to a UE via an RU, one or more downlink messages using a carrier that supports signaling for two or more operators, where the one or more downlink messages are transmitted based on a separation of physical layer signaling for the two or more operators. The operations of 2205 may be performed in accordance with examples as disclosed herein. In some examples, aspects of the operations of 2205 may be performed by a carrier manager 1225 as described with reference to FIG. 12.

At 2210, the method may include communicating, via the RU, with the UE using the carrier, where one or more unicast messages are communicated using a first set of resources associated with a first operator of the two or more operators or using a second set of resources associated with a second operator of the two or more operators, the second set of resources being different from the first set of resources. The operations of 2210 may be performed in accordance with examples as disclosed herein. In some examples, aspects of the operations of 2210 may be performed by a wireless resource manager 1230 as described with reference to FIG. 12.

At 2215, the method may include transmitting, via the carrier, one or more channel state information reference signals, where the one or more channel state information reference signals are associated with the first operator and the second operator. The operations of 2215 may be performed in accordance with examples as disclosed herein. In some examples, aspects of the operations of 2215 may be performed by a reference signal manager 1250 as described with reference to FIG. 12.

At 2220, the method may include receiving one or more sounding reference signals from the UE via the carrier. The operations of 2220 may be performed in accordance with examples as disclosed herein. In some examples, aspects of the operations of 2220 may be performed by a reference signal manager 1250 as described with reference to FIG. 12.

At 2225, the method may include forwarding the one or more sounding reference signals to a first network entity associated with the first operator or to a second network entity associated with the second operator. The operations of 2225 may be performed in accordance with examples as disclosed herein. In some examples, aspects of the operations of 2225 may be performed by a reference signal manager 1250 as described with reference to FIG. 12.

FIG. 23 shows a flowchart illustrating a method 2300 that supports dynamic carrier sharing techniques for RU sharing in accordance with one or more aspects of the present disclosure. The operations of the method 2300 may be implemented by a UE or its components as described herein. For example, the operations of the method 2300 may be performed by a UE 115 as described with reference to FIGS. 1 through 9 and 14 through 17. In some examples, a UE may execute a set of instructions to control the functional elements of the UE to perform the described functions. Additionally, or alternatively, the UE may perform aspects of the described functions using special-purpose hardware.

At 2305, the method may include receiving, from an RU, one or more downlink messages via a carrier that supports signaling for two or more operators. The operations of 2305 may be performed in accordance with examples as disclosed herein. In some examples, aspects of the operations of 2305 may be performed by a carrier manager 1625 as described with reference to FIG. 16.

At 2310, the method may include communicating with the RU using the carrier and based on the one or more downlink messages, where one or more unicast messages are communicated using a first set of resources associated with a first operator of the two or more operators or using a second set of resources associated with a second operator of the two or more operators, the second set of resources being different from the first set of resources. The operations of 2310 may be performed in accordance with examples as disclosed herein. In some examples, aspects of the operations of 2310 may be performed by a wireless resource manager 1630 as described with reference to FIG. 16.

FIG. 24 shows a flowchart illustrating a method 2400 that supports dynamic carrier sharing techniques for RU sharing in accordance with one or more aspects of the present disclosure. The operations of the method 2400 may be implemented by a UE or its components as described herein. For example, the operations of the method 2400 may be performed by a UE 115 as described with reference to FIGS. 1 through 9 and 14 through 17. In some examples, a UE may execute a set of instructions to control the functional elements of the UE to perform the described functions. Additionally, or alternatively, the UE may perform aspects of the described functions using special-purpose hardware.

At 2405, the method may include receiving, via a carrier, a shared set of synchronization signal blocks associated with a first operator and a second operator. The operations of 2405 may be performed in accordance with examples as disclosed herein. In some examples, aspects of the operations of 2405 may be performed by an SSB manager 1635 as described with reference to FIG. 16.

At 2410, the method may include receiving, via the carrier, one or more shared system information messages associated the first operator and the second operator. The operations of 2410 may be performed in accordance with examples as disclosed herein. In some examples, aspects of the operations of 2410 may be performed by an SSB manager 1635 as described with reference to FIG. 16.

At 2415, the method may include receiving, from an RU, one or more downlink messages via a carrier that supports signaling for two or more operators. The operations of 2415 may be performed in accordance with examples as disclosed herein. In some examples, aspects of the operations of 2415 may be performed by a carrier manager 1625 as described with reference to FIG. 16.

At 2420, the method may include communicating with the RU using the carrier and based on the one or more downlink messages, where one or more unicast messages are communicated using a first set of resources associated with a first operator of the two or more operators or using a second set of resources associated with a second operator of the two or more operators, the second set of resources being different from the first set of resources, where communicating with the RU is based on the shared set of synchronization signal blocks and the one or more shared system information messages. The operations of 2420 may be performed in accordance with examples as disclosed herein. In some examples, aspects of the operations of 2420 may be performed by a wireless resource manager 1630 as described with reference to FIG. 16.

FIG. 25 shows a flowchart illustrating a method 2500 that supports dynamic carrier sharing techniques for RU sharing in accordance with one or more aspects of the present disclosure. The operations of the method 2500 may be implemented by a UE or its components as described herein. For example, the operations of the method 2500 may be performed by a UE 115 as described with reference to FIGS. 1 through 9 and 14 through 17. In some examples, a UE may execute a set of instructions to control the functional elements of the UE to perform the described functions. Additionally, or alternatively, the UE may perform aspects of the described functions using special-purpose hardware.

At 2505, the method may include receiving, via a carrier, a shared set of synchronization signal blocks associated with a first operator and a second operator. The operations of 2505 may be performed in accordance with examples as disclosed herein. In some examples, aspects of the operations of 2505 may be performed by an SSB manager 1635 as described with reference to FIG. 16.

At 2510, the method may include receiving, via the carrier, one or more shared system information messages associated the first operator and the second operator, where communicating with an RU is based on the shared set of synchronization signal blocks and the one or more shared system information messages. The operations of 2510 may be performed in accordance with examples as disclosed herein. In some examples, aspects of the operations of 2510 may be performed by an SSB manager 1635 as described with reference to FIG. 16.

At 2515, the method may include performing, via the carrier, an access operation with the RU in accordance with a first random access configuration or a second random access configuration, where the access operation includes a series of random access messages transmitted between the RU and the UE via a first set of random access resources associated with the first random access configuration or via a second set of random access resources associated with the second random access configuration, and where the first set of random access resources is different from the second set of random access resources. The operations of 2515 may be performed in accordance with examples as disclosed herein. In some examples, aspects of the operations of 2515 may be performed by a random access manager 1650 as described with reference to FIG. 16.

FIG. 26 shows a flowchart illustrating a method 2600 that supports dynamic carrier sharing techniques for RU sharing in accordance with one or more aspects of the present disclosure. The operations of the method 2600 may be implemented by a UE or its components as described herein. For example, the operations of the method 2600 may be performed by a UE 115 as described with reference to FIGS. 1 through 9 and 14 through 17. In some examples, a UE may execute a set of instructions to control the functional elements of the UE to perform the described functions. Additionally, or alternatively, the UE may perform aspects of the described functions using special-purpose hardware.

At 2605, the method may include receiving, via a carrier, a shared set of synchronization signal blocks associated with a first operator and a second operator. The operations of 2605 may be performed in accordance with examples as disclosed herein. In some examples, aspects of the operations of 2605 may be performed by an SSB manager 1635 as described with reference to FIG. 16.

At 2610, the method may include receiving, via the carrier, one or more shared system information messages associated the first operator and the second operator, where communicating with an RU is based on the shared set of synchronization signal blocks and the one or more shared system information messages. The operations of 2610 may be performed in accordance with examples as disclosed herein. In some examples, aspects of the operations of 2610 may be performed by an SSB manager 1635 as described with reference to FIG. 16.

At 2615, the method may include performing, via the carrier, an access operation with the RU based on one or more shared random access resources of the carrier, where the access operation includes a series of random access messages transmitted between the RU and the UE via the one or more shared random access resources. The operations of 2615 may be performed in accordance with examples as disclosed herein. In some examples, aspects of the operations of 2615 may be performed by a random access manager 1650 as described with reference to FIG. 16.

At 2620, the method may include receiving, via the carrier, a downlink random access message using a first random access resource associated with the first operator or a second random access resource associated with the second operator, the downlink random access message being transmitted in response to an uplink random access message of the series of random access messages, where the first random access resource is different from the second random access resource. The operations of 2620 may be performed in accordance with examples as disclosed herein. In some examples, aspects of the operations of 2620 may be performed by a random access manager 1650 as described with reference to FIG. 16.

FIG. 27 shows a flowchart illustrating a method 2700 that supports dynamic carrier sharing techniques for RU sharing in accordance with one or more aspects of the present disclosure. The operations of the method 2700 may be implemented by a UE or its components as described herein. For example, the operations of the method 2700 may be performed by a UE 115 as described with reference to FIGS. 1 through 9 and 14 through 17. In some examples, a UE may execute a set of instructions to control the functional elements of the UE to perform the described functions. Additionally, or alternatively, the UE may perform aspects of the described functions using special-purpose hardware.

At 2705, the method may include receiving, via a carrier, a shared set of synchronization signal blocks associated with a first operator and a second operator. The operations of 2705 may be performed in accordance with examples as disclosed herein. In some examples, aspects of the operations of 2705 may be performed by an SSB manager 1635 as described with reference to FIG. 16.

At 2710, the method may include receiving, via the carrier, one or more shared system information messages associated the first operator and the second operator, where communicating with an RU is based on the shared set of synchronization signal blocks and the one or more shared system information messages. The operations of 2710 may be performed in accordance with examples as disclosed herein. In some examples, aspects of the operations of 2710 may be performed by an SSB manager 1635 as described with reference to FIG. 16.

At 2715, the method may include performing, via the carrier, an access operation with the RU based on one or more shared random access resources of the carrier, where the access operation includes a series of random access messages transmitted between the RU and the UE via the one or more shared random access resources. The operations of 2715 may be performed in accordance with examples as disclosed herein. In some examples, aspects of the operations of 2715 may be performed by a random access manager 1650 as described with reference to FIG. 16.

At 2720, the method may include receiving, via the carrier, a first unicast message from the RU via a set of resources shared by the first operator and the second operator, the first unicast message including an indication of a list of PLMN identifiers associated with the first operator and the second operator. The operations of 2720 may be performed in accordance with examples as disclosed herein. In some examples, aspects of the operations of 2720 may be performed by a wireless resource manager 1630 as described with reference to FIG. 16.

At 2725, the method may include transmitting, via the carrier, a second unicast message to the RU via the set of resources, the second unicast message indicating a PLMN identifier from a list of PLMN identifiers, where communicating with the RU is based on the PLMN identifier. The operations of 2725 may be performed in accordance with examples as disclosed herein. In some examples, aspects of the operations of 2725 may be performed by a wireless resource manager 1630 as described with reference to FIG. 16.

FIG. 28 shows a flowchart illustrating a method 2800 that supports dynamic carrier sharing techniques for RU sharing in accordance with one or more aspects of the present disclosure. The operations of the method 2800 may be implemented by a UE or its components as described herein. For example, the operations of the method 2800 may be performed by a UE 115 as described with reference to FIGS. 1 through 9 and 14 through 17. In some examples, a UE may execute a set of instructions to control the functional elements of the UE to perform the described functions. Additionally, or alternatively, the UE may perform aspects of the described functions using special-purpose hardware.

At 2805, the method may include receiving, from an RU, one or more downlink messages via a carrier that supports signaling for two or more operators. The operations of 2805 may be performed in accordance with examples as disclosed herein. In some examples, aspects of the operations of 2805 may be performed by a carrier manager 1625 as described with reference to FIG. 16.

At 2810, the method may include communicating with the RU using the carrier and based on the one or more downlink messages, where one or more unicast messages are communicated using a first set of resources associated with a first operator of the two or more operators or using a second set of resources associated with a second operator of the two or more operators, the second set of resources being different from the first set of resources. The operations of 2810 may be performed in accordance with examples as disclosed herein. In some examples, aspects of the operations of 2810 may be performed by a wireless resource manager 1630 as described with reference to FIG. 16.

At 2815, the method may include receiving, via the carrier, one or more channel state information reference signals, where the one or more channel state information reference signals are associated with the first operator and the second operator. The operations of 2815 may be performed in accordance with examples as disclosed herein. In some examples, aspects of the operations of 2815 may be performed by a reference signal manager 1640 as described with reference to FIG. 16.

At 2820, the method may include receiving, from the RU, a control message indicating that the carrier is configured as an uplink bandwidth part or a downlink bandwidth part, where communicating with the UE using the carrier is based on the control message. The operations of 2820 may be performed in accordance with examples as disclosed herein. In some examples, aspects of the operations of 2820 may be performed by a wireless resource manager 1630 as described with reference to FIG. 16.

The following provides an overview of aspects of the present disclosure:

Aspect 1: A method for wireless communications, comprising: transmitting, to a UE via a radio unit, one or more downlink messages using a carrier that supports signaling for two or more operators, wherein the one or more downlink messages are transmitted based at least in part on a separation of physical layer signaling for the two or more operators; and communicating, via the radio unit, with the UE using the carrier, wherein one or more unicast messages are communicated using a first set of resources associated with a first operator of the two or more operators or using a second set of resources associated with a second operator of the two or more operators, the second set of resources being different from the first set of resources.

Aspect 2: The method of aspect 1, further comprising: receiving, by a first network entity associated with the radio unit, one or more control messages indicating a configuration for separating resources for communicating with the UE using the carrier, wherein communicating with the UE is based at least in part on the configuration.

Aspect 3: The method of any of aspects 1 through 2, wherein the separation of the physical layer signaling comprises a full separation of the physical layer signaling for the two or more operators, and wherein transmitting the one or more downlink messages comprises: transmitting a first set of synchronization signal blocks associated with the first operator in accordance with a first synchronization raster of the carrier; and transmitting a second set of synchronization signal blocks associated with the second operator in accordance with a second synchronization raster that is different than the first synchronization raster of the carrier, the first set of synchronization signal blocks indicating a first initial bandwidth part of the carrier and the second set of synchronization signal blocks indicating a second initial bandwidth part of the carrier different from the first initial bandwidth part.

Aspect 4: The method of aspect 3, further comprising: transmitting, via the carrier, one or more first system information messages associated with the first operator and using a first set of resources; and transmitting, via the carrier, one or more second system information messages associated with the second operator and using a second set of resources different from the first set of resources, wherein communicating with the UE using the carrier is based at least in part on transmitting the one or more first system information messages and the one or more second system information messages.

Aspect 5: The method of aspect 4, wherein the one or more first system information messages and the one or more second system information messages each indicate a same time-division duplexing resource pattern, a same synchronization signal position, or both.

Aspect 6: The method of any of aspects 3 through 5, further comprising: performing, via the carrier, an access operation with the UE using a first set of random access resources associated with the first operator or a second set of random access resources associated with the second operator, the access operation comprising a series of random access messages between the radio unit and the UE via the first set of random access resources or the second set of random access resources, wherein the first set of random access resources are different from the second set of random access resources in the carrier.

Aspect 7: The method of any of aspects 3 through 6, further comprising: transmitting, to the UE, a control message indicating that the carrier is configured as an uplink bandwidth part or a downlink bandwidth part, wherein communicating with the UE using the carrier is based at least in part on the control message.

Aspect 8: The method of any of aspects 1 through 2, wherein the separation of the physical layer signaling comprises a partial separation of the physical layer signaling for the two or more operators, and wherein transmitting the one or more downlink messages comprises: transmitting, via the carrier, a shared set of synchronization signal blocks associated with the first operator and the second operator; and transmitting, via the carrier, one or more shared system information messages associated the first operator and the second operator, wherein communicating with the UE is based at least in part on the shared set of synchronization signal blocks and the one or more shared system information messages.

Aspect 9: The method of aspect 8, wherein the one or more shared system information messages comprise first information that is common to the first operator and the second operator and second information that is different for the first operator and the second operator.

Aspect 10: The method of any of aspects 8 through 9, further comprising: performing, via the carrier, an access operation with the UE based at least in part on a first random access configuration associated with the first operator or a second random access configuration associated with the second operator, the first random access configuration and the second random access configuration being indicated by a system information message of the one or more shared system information messages, wherein the access operation comprises a series of access messages transmitted between the radio unit and the UE via a first set of random access resources associated with the first random access configuration or via a second set of random access resources associated with the second random access configuration, and wherein the first set of random access resources is different from the second set of random access resources.

Aspect 11: The method of any of aspects 8 through 9, further comprising: performing, via the carrier, an access operation with the UE based at least in part on one or more shared random access resources of the carrier, wherein the access operation comprises a series of random access messages transmitted between the radio unit and the UE via the one or more shared random access resources; and transmitting, via the carrier, a downlink random access message to the UE using a first random access resource associated with the first operator or a second random access resource associated with the second operator, the downlink random access message being transmitted in response to an uplink random access message of the series of random access messages, wherein the first random access resource is different from the second random access resource.

Aspect 12: The method of aspect 11, wherein the uplink random access message indicates a first public land mobile network (PLMN) identifier selected from a list of PLMN identifiers associated with the first operator and the second operator, wherein a system information message of the one or more shared system information messages indicates the list of PLMN identifiers.

Aspect 13: The method of aspect 12, further comprising: forwarding the uplink random access message to a first network entity associated with the first operator or to a second network entity associated with the second operator based at least in part on the PLMN identifier, wherein transmitting the downlink random access message is based at least in part on forwarding the uplink random access message.

Aspect 14: The method of any of aspects 8 through 9, further comprising: performing, via the carrier, an access operation with the UE based at least in part on one or more shared random access resources of the carrier, wherein the access operation comprises a series of random access messages transmitted between the radio unit and the UE via the one or more shared random access resources; transmitting, via the carrier, a first unicast message to the UE via a set of resources shared by the first operator and the second operator, the first unicast message comprising an indication of a list of public land mobile network (PLMN) identifiers associated with the first operator and the second operator; and receiving, via the carrier, a second unicast message from the UE via the set of resources, the second unicast message indicating a PLMN identifier from a list of PLMN identifiers, wherein communicating with the UE is based at least in part on the PLMN identifier.

Aspect 15: The method of any of aspects 8 through 14, wherein a system information message of the one or more shared system information messages comprises a list of public land mobile network (PLMN) identifiers.

Aspect 16: The method of any of aspects 1 through 15, further comprising: transmitting, via the carrier, one or more channel state information reference signals, wherein the one or more channel state information reference signals are associated with the first operator and the second operator.

Aspect 17: The method of any of aspects 1 through 16, further comprising: receiving one or more sounding reference signals from the UE via the carrier; and forwarding the one or more sounding reference signals to a first network entity associated with the first operator or to a second network entity associated with the second operator.

Aspect 18: The method of any of aspects 1 through 17, wherein the radio unit operates in one or more unlicensed radio frequency spectrum bands, one or more radio frequency spectrum bands that are shared by the first operator and the second operator, one or more licensed radio frequency spectrum bands, or any combination thereof.

Aspect 19: A method for wireless communications at a UE, comprising: receiving, from a radio unit, one or more downlink messages via a carrier that supports signaling for two or more operators; and communicating with the radio unit using the carrier and based at least in part on the one or more downlink messages, wherein one or more unicast messages are communicated using a first set of resources associated with a first operator of the two or more operators or using a second set of resources associated with a second operator of the two or more operators, the second set of resources being different from the first set of resources.

Aspect 20: The method of aspect 19, wherein receiving the one or more downlink messages comprises: receiving, via the carrier, a shared set of synchronization signal blocks associated with the first operator and the second operator; and receiving, via the carrier, one or more shared system information messages associated the first operator and the second operator, wherein communicating with the radio unit is based at least in part on the shared set of synchronization signal blocks and the one or more shared system information messages.

Aspect 21: The method of aspect 20, wherein the one or more shared system information messages comprise first information that is common to the first operator and the second operator and second information that is different for the first operator and the second operator.

Aspect 22: The method of any of aspects 20 through 21, wherein a system information message of the one or more shared system information messages comprises a first random access configuration associated with the first operator and a second random access configuration associated with the second operator, the method further comprising: performing, via the carrier, an access operation with the radio unit in accordance with the first random access configuration or the second random access configuration, wherein the access operation comprises a series of random access messages transmitted between the radio unit and the UE via a first set of random access resources associated with the first random access configuration or via a second set of random access resources associated with the second random access configuration, and wherein the first set of random access resources is different from the second set of random access resources.

Aspect 23: The method of any of aspects 20 through 21, further comprising: performing, via the carrier, an access operation with the radio unit based at least in part on one or more shared random access resources of the carrier, wherein the access operation comprises a series of random access messages transmitted between the radio unit and the UE via the one or more shared random access resources; and receiving, via the carrier, a downlink random access message using a first random access resource associated with the first operator or a second random access resource associated with the second operator, the downlink random access message being transmitted in response to an uplink random access message of the series of random access messages, wherein the first random access resource is different from the second random access resource.

Aspect 24: The method of aspect 23, wherein the uplink random access message indicates a first public land mobile network (PLMN) identifier selected from a list of PLMN identifiers associated with the first operator and the second operator, wherein a system information message of the one or more shared system information messages indicates the list of PLMN identifiers.

Aspect 25: The method of any of aspects 20 through 21, further comprising: performing, via the carrier, an access operation with the radio unit based at least in part on one or more shared random access resources of the carrier, wherein the access operation comprises a series of random access messages transmitted between the radio unit and the UE via the one or more shared random access resources; receiving, via the carrier, a first unicast message from the radio unit via a set of resources shared by the first operator and the second operator, the first unicast message comprising an indication of a list of public land mobile network (PLMN) identifiers associated with the first operator and the second operator; and transmitting, via the carrier, a second unicast message to the radio unit via the set of resources, the second unicast message indicating a PLMN identifier from a list of PLMN identifiers, wherein communicating with the radio unit is based at least in part on the PLMN identifier.

Aspect 26: The method of any of aspects 20 through 25, wherein a system information message of the one or more shared system information messages comprises a list of public land mobile network (PLMN) identifiers, the method further comprising: refraining from performing an access operation with the radio unit based at least in part on the list of PLMN identifiers.

Aspect 27: The method of any of aspects 19 through 26, further comprising: receiving, via the carrier, one or more channel state information reference signals, wherein the one or more channel state information reference signals are associated with the first operator and the second operator.

Aspect 28: The method of any of aspects 19 through 27, further comprising: receiving, from the radio unit, a control message indicating that the carrier is configured as an uplink bandwidth part or a downlink bandwidth part, wherein communicating with the UE using the carrier is based at least in part on the control message.

Aspect 29: An apparatus for wireless communications, comprising a processor; memory coupled with the processor; and instructions stored in the memory and executable by the processor to cause the apparatus to perform a method of any of aspects 1 through 18.

Aspect 30: An apparatus for wireless communications, comprising at least one means for performing a method of any of aspects 1 through 18.

Aspect 31: A non-transitory computer-readable medium storing code for wireless communications, the code comprising instructions executable by a processor to perform a method of any of aspects 1 through 18.

Aspect 32: An apparatus for wireless communications at a UE, comprising a processor; memory coupled with the processor; and instructions stored in the memory and executable by the processor to cause the apparatus to perform a method of any of aspects 19 through 28.

Aspect 33: An apparatus for wireless communications at a UE, comprising at least one means for performing a method of any of aspects 19 through 28.

Aspect 34: A non-transitory computer-readable medium storing code for wireless communications at a UE, the code comprising instructions executable by a processor to perform a method of any of aspects 19 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications, comprising:

transmitting, to a user equipment (UE) via a radio unit, one or more downlink messages using a carrier that supports signaling for two or more operators, the one or more downlink messages transmitted in accordance with a separation of physical layer signaling via the carrier for the two or more operators; and communicating, via the radio unit and with the UE using the carrier, one or more unicast messages using a first set of resources associated with a first operator of the two or more operators or using a second set of resources associated with a second operator of the two or more operators, the second set of resources being different from the first set of resources, wherein the carrier comprises the first set of resources and the second set of resources, wherein the separation of the physical layer signaling comprises a full separation of the physical layer signaling for the two or more operators, and wherein transmitting the one or more downlink messages comprises:

transmitting a first set of synchronization signal blocks associated with the first operator in accordance with a first synchronization raster of the carrier; and transmitting a second set of synchronization signal blocks associated with the second operator in accordance with a second synchronization raster that is different than the first synchronization raster of the carrier, the first set of synchronization signal blocks indicating a first initial bandwidth part of the carrier and the second set of synchronization signal blocks indicating a second initial bandwidth part of the carrier different from the first initial bandwidth part.

2. The method of claim 1, further comprising receiving, by a first network entity associated with the radio unit, one or more control messages indicating a configuration for separating resources for communicating with the UE using the carrier, wherein communicating with the UE is in accordance with the configuration.

3. The method of claim 1, further comprising:

transmitting, via the carrier, one or more first system information messages associated with the first operator and using the first set of resources; and transmitting, via the carrier, one or more second system information messages associated with the second operator and using the second set of resources different from the first set of resources, wherein communicating with the UE using the carrier is in accordance with transmitting the one or more first system information messages and the one or more second system information messages.

4. The method of claim 3, wherein the one or more first system information messages and the one or more second system information messages each indicate a same time-division duplexing resource pattern, a same synchronization signal position, or both.

5. The method of claim 1, further comprising performing, via the carrier, an access operation with the UE using a first set of random access resources associated with the first operator or a second set of random access resources associated with the second operator, the access operation comprising a series of random access messages between the radio unit and the UE via the first set of random access resources or the second set of random access resources, the first set of random access resources being different from the second set of random access resources in the carrier.

6. The method of claim 1, further comprising transmitting, to the UE, a control message indicating that the carrier is configured as an uplink bandwidth part or a downlink bandwidth part, wherein communicating with the UE using the carrier is in accordance with the control message.

7. The method of claim 1, wherein the separation of the physical layer signaling comprises a partial separation of the physical layer signaling for the two or more operators, and wherein transmitting the one or more downlink messages comprises:

transmitting, via the carrier, a shared set of synchronization signal blocks associated with the first operator and the second operator; and transmitting, via the carrier, one or more shared system information messages associated the first operator and the second operator, wherein communicating with the UE is in accordance with the shared set of synchronization signal blocks and the one or more shared system information messages.

8. The method of claim 7, wherein the one or more shared system information messages comprise first information that is common to the first operator and the second operator and second information that is different for the first operator and the second operator.

9. The method of claim 7, further comprising performing, via the carrier, an access operation with the UE in accordance with a first random access configuration associated with the first operator or a second random access configuration associated with the second operator, the first random access configuration and the second random access configuration being indicated by a system information message of the one or more shared system information messages, the access operation comprising a series of access messages transmitted between the radio unit and the UE via a first set of random access resources associated with the first random access configuration or via a second set of random access resources associated with the second random access configuration, and the first set of random access resources being different from the second set of random access resources.

10. The method of claim 7, further comprising:

performing, via the carrier, an access operation with the UE in accordance with one or more shared random access resources of the carrier, the access operation comprising a series of random access messages transmitted between the radio unit and the UE via the one or more shared random access resources; and transmitting, via the carrier, a downlink random access message to the UE using a first random access resource associated with the first operator or a second random access resource associated with the second operator, the downlink random access message being transmitted in response to an uplink random access message of the series of random access messages, the first random access resource being different from the second random access resource.

11. The method of claim 10, wherein the uplink random access message indicates a first public land mobile network (PLMN) identifier selected from a list of PLMN identifiers associated with the first operator and the second operator, a system information message of the one or more shared system information messages indicating the list of PLMN identifiers.

12. The method of claim 11, further comprising forwarding the uplink random access message to a first network entity associated with the first operator or to a second network entity associated with the second operator in accordance with the PLMN identifier, wherein transmitting the downlink random access message is in accordance with forwarding the uplink random access message.

13. The method of claim 7, further comprising:

performing, via the carrier, an access operation with the UE in accordance with one or more shared random access resources of the carrier, the access operation comprising a series of random access messages transmitted between the radio unit and the UE via the one or more shared random access resources;

transmitting, via the carrier, a first unicast message to the UE via a set of resources shared by the first operator and the second operator, the first unicast message comprising an indication of a list of public land mobile network (PLMN) identifiers associated with the first operator and the second operator; and receiving, via the carrier, a second unicast message from the UE via the set of resources, the second unicast message indicating a PLMN identifier from a list of PLMN identifiers, wherein communicating with the UE is in accordance with the PLMN identifier.

14. The method of claim 7, wherein a system information message of the one or more shared system information messages comprises a list of public land mobile network (PLMN) identifiers.

15. The method of claim 1, further comprising transmitting, via the carrier, one or more channel state information reference signals, the one or more channel state information reference signals being associated with the first operator and the second operator.

16. The method of claim 1, further comprising:
receiving one or more sounding reference signals from the UE via the carrier; and
forwarding the one or more sounding reference signals to a first network entity associated with the first operator or to a second network entity associated with the second operator.

17. The method of claim 1, wherein the radio unit operates in one or more unlicensed radio frequency spectrum bands, one or more radio frequency spectrum bands that are shared by the first operator and the second operator, one or more licensed radio frequency spectrum bands, or any combination thereof.

18. A method for wireless communications at a user equipment (UE), comprising:
receiving, from a radio unit, one or more downlink messages via a carrier that supports signaling for two or more operators; and
communicating, with the radio unit using the carrier and in accordance with the one or more downlink messages, one or more unicast messages using a first set of resources associated with a first operator of the two or more operators or using a second set of resources associated with a second operator of the two or more operators, the second set of resources being different from the first set of resources, wherein the carrier comprises the first set of resources and the second set of resources,
wherein:
receiving the one or more downlink messages comprises:
receiving, via the carrier, a shared set of synchronization signal blocks associated with the first operator and the second operator; and
receiving, via the carrier, one or more shared system information messages associated the first operator and the second operator, wherein communicating with the radio unit is in accordance with the shared set of synchronization signal blocks and the one or more shared system information messages, and
wherein a system information message of the one or more shared system information messages comprises a first random access configuration associated with the first operator and a second random access configuration associated with the second operator, the method further comprising performing, via the carrier, an access operation with the radio unit in accordance with the first random access configuration or the second random access configuration, the access operation comprising a series of random access messages transmitted between the radio unit and the UE via a first set of random access resources associated with the first random access configuration or via a second set of random access resources associated with the second random access configuration, and the first set of random access resources being different from the second set of random access resources.

19. The method of claim 18, wherein the one or more shared system information messages comprise first information that is common to the first operator and the second operator and second information that is different for the first operator and the second operator.

20. The method of claim 18, further comprising:
performing, via the carrier, an access operation with the radio unit in accordance with one or more shared random access resources of the carrier, the access operation comprising a series of random access messages transmitted between the radio unit and the UE via the one or more shared random access resources; and
receiving, via the carrier, a downlink random access message using a first random access resource associated with the first operator or a second random access resource associated with the second operator, the downlink random access message being transmitted in response to an uplink random access message of the series of random access messages, and the first random access resource being different from the second random access resource.

21. The method of claim 20, wherein the uplink random access message indicates a first public land mobile network (PLMN) identifier selected from a list of PLMN identifiers associated with the first operator and the second operator, a system information message of the one or more shared system information messages indicating the list of PLMN identifiers.

22. The method of claim 18, further comprising:
performing, via the carrier, an access operation with the radio unit in accordance with one or more shared random access resources of the carrier, the access operation comprising a series of random access messages transmitted between the radio unit and the UE via the one or more shared random access resources;
receiving, via the carrier, a first unicast message from the radio unit via a set of resources shared by the first operator and the second operator, the first unicast message comprising an indication of a list of public land mobile network (PLMN) identifiers associated with the first operator and the second operator; and
transmitting, via the carrier, a second unicast message to the radio unit via the set of resources, the second unicast message indicating a PLMN identifier from a list of PLMN identifiers, wherein communicating with the radio unit is in accordance with the PLMN identifier.

23. The method of claim 18, wherein a system information message of the one or more shared system information messages comprises a list of public land mobile network (PLMN) identifiers, the method further comprising refraining from performing an access operation with the radio unit in accordance with the list of PLMN identifiers.

24. The method of claim 18, further comprising receiving, via the carrier, one or more channel state information reference signals, the one or more channel state information reference signals being associated with the first operator and the second operator.

25. The method of claim 18, further comprising:
receiving, from the radio unit, a control message indicating that the carrier is configured as an uplink bandwidth part or a downlink bandwidth part, wherein communicating with the UE using the carrier is in accordance with the control message.

26. An apparatus for wireless communications, comprising:

one or more processors;

one or more memories coupled with the one or more processors; and instructions stored in the one or more memories and executable by the one or more processors to cause the apparatus to:

transmit, to a user equipment (UE) via a radio unit, one or more downlink messages using a carrier that supports signaling for two or more operators, wherein the one or more downlink messages are transmitted in accordance with a separation of physical layer signaling via the carrier for the two or more operators; and communicate, via the radio unit and with the UE using the carrier, one or more unicast messages using a first set of resources associated with a first operator of the two or more operators or using a second set of resources associated with a second operator of the two or more operators, the second set of resources being different from the first set of resources, wherein the carrier comprises the first set of resources and the second set of resources, wherein the separation of the physical layer signaling comprises a full separation of the physical layer signaling for the two or more operators, and wherein the instructions are executable by the one or more processors to cause the apparatus to:

transmit a first set of synchronization signal blocks associated with the first operator in accordance with a first synchronization raster of the carrier; and transmit a second set of synchronization signal blocks associated with the second operator in accordance with a second synchronization raster that is different than the first synchronization raster of the carrier, the first set of synchronization signal blocks indicating a first initial bandwidth part of the carrier and the second set of synchronization signal blocks indicating a second initial bandwidth part of the carrier different from the first initial bandwidth part.

27. An apparatus for wireless communications at a user equipment (UE), comprising:

one or more processors;

one or more memories coupled with the one or more processors; and instructions stored in the one or more memories and executable by the one or more processors to cause the apparatus to:

receive, from a radio unit, one or more downlink messages via a carrier that supports signaling for two or more operators; and communicate, with the radio unit using the carrier and in accordance with the one or more downlink messages, one or more unicast messages using a first set of resources associated with a first operator of the two or more operators or using a second set of resources associated with a second operator of the two or more operators, the second set of resources being different from the first set of resources, wherein the carrier comprises the first set of resources and the second set of resources, wherein the instructions are executable by the one or more processors to cause the apparatus to:

receive, via the carrier, a shared set of synchronization signal blocks associated with the first operator and the second operator;

receive, via the carrier, one or more shared system information messages associated the first operator and the second operator;

communicate with the radio unit is in accordance with the shared set of synchronization signal blocks and the one or more shared system information messages, wherein a system information message of the one or more shared system information messages comprises a first random access configuration associated with the first operator and a second random access configuration associated with the second operator; and perform, via the carrier, an access operation with the radio unit in accordance with the first random access configuration or the second random access configuration, the access operation comprising a series of random access messages transmitted between the radio unit and the UE via a first set of random access resources associated with the first random access configuration or via a second set of random access resources associated with the second random access configuration, and the first set of random access resources being different from the second set of random access resources.

* * * * *